United States Patent [19]

Walker

[11] Patent Number: 4,958,918
[45] Date of Patent: Sep. 25, 1990

[54] OPTICAL SIGNAL CONTROL METHOD AND APPARATUS

[75] Inventor: Nigel G. Walker, Ipswich, England

[73] Assignee: British Telecommunications public limited company, United Kingdom

[21] Appl. No.: 294,069

[22] PCT Filed: Apr. 13, 1988

[86] PCT No.: PCT/GB88/00282

§ 371 Date: Jan. 3, 1989

§ 102(e) Date: Jan. 3, 1989

[87] PCT Pub. No.: WO88/08147

PCT Pub. Date: Oct. 20, 1988

[30] Foreign Application Priority Data

Apr. 16, 1987 [GB] United Kingdom ................. 8709247

[51] Int. Cl.$^5$ ........................... G02F 1/07; G02F 1/09
[52] U.S. Cl. ................................... 350/378; 350/387; 350/389; 455/616
[58] Field of Search ............... 350/96.12, 96.13, 96.14, 350/387, 389, 377, 378; 455/616

[56] References Cited

U.S. PATENT DOCUMENTS

| | | | |
|---|---|---|---|
| 3,558,214 | 1/1971 | Lang et al. | 350/389 |
| 3,558,215 | 1/1971 | Lang et al. | 350/389 |
| 4,384,760 | 5/1983 | Alferness | 350/389 |
| 4,752,120 | 6/1988 | Shimizu | 350/96.14 |

OTHER PUBLICATIONS

Electronic Letters, vol. 21, No. 2, Jan. 17, 1985, T. Imai et al., "Optical Polarization Control Utilizing an Optical Heterodyne Detection Scheme", pp. 52, 53.
Electronics Letters, vol. 21, No. 20, Sep. 26, 1985, T. Okoshi et al.: "New Polarization-State Control Device: Rotatable Fiber Cranks", pp. 895–896.
Electronics Letters, vol. 22, No. 2, Jan. 16, 1986, L. J. Rysdale: "Method of Overcoming Finite-Range limitation of Certain State of Polarization Control Devices in Automatic Polarization Control Schemes", pp. 100–102.
Applied Physics Letters, vol. 35, No. 11, Dec. 1, 1979, American Institute of Physics (New York, US), R. Ulrich: "Polarization Stabilization on Single-Mode Fiber", pp. 840–842.
Applied Physics Letters, vol. 38, No. 9, May 1, 1981, American Institute of Physics (New York, US), R. C. Alferness et al.: "Waveguide Electro-Optic Polarization Transformer", pp. 655–657.
Optics Letters, vol. 11, No. 1, Jan. 1986, Optical Society of America (New York, US), S. Thaniyavarn: "Wavelength-Independent, Optical-Damage-Immune LiNbO3 TE-TM Mode Converter", pp. 39–41.

*Primary Examiner*—Bruce Y. Arnold
*Assistant Examiner*—Martin Lerner
*Attorney, Agent, or Firm*—Nixon & Vanderhye

[57] ABSTRACT

Apparatus for processing one or more optical signals to produce a desired polarisation transformation on a Poincare sphere has particular application in a receiver for a coherent communication system. One or more birefringent elements (11) receive a polarised optical signal from a local oscillator (12), and vary the state of polarisation of the local optical signal in order to match it to a received optical signal from a remote source on a line (13). The transformed local signal is fed on a line (14) to a directional coupler (15) which compares the local and remote optical signals. A receiver (16) extracts data by interference between the two signals in the directional coupler (15), and feeds data out at a line (17). A level detector (18) detects the level of the output signal (17) and supplies a feed-back signal to a polarisation controller (19), which controls the birefringent element or elements (11). The birefringent device (11) is adapted to provide a variable rotation on a Poincare sphere about an axis of rotation which itself may be varied in direction. The control means (19) varies the amount of rotation on the Poincare sphere produced by the birefringent device, and varies the direction of the axis about which the rotation takes place, so as to achieve the desired polarisation transformation. A preferred form of the birefringent device (11) comprises a waveguide (20) of electro-optic material, and means (22, 23) for producing in the electro-optic material an electric field or variable strength and variable orientation whereby required polarisation transformation can take place. Preferably the electro-optic material is lithium niobate.

35 Claims, 18 Drawing Sheets

Configuration space.

Index ellipsoid.

Poincaré sphere - plan view.

Plan view.

End view

| | Length of substrate | Drive voltage |
|---|---|---|

Single element
$(2\pi)$
V

Two elements
$(2\pi)$   $(2\pi)$
2V

Two elements
$(\pi)$   $(\pi)$
V

Four elements
$(2\pi)$  $(2\pi)$  $(2\pi)$  $(2\pi)$
4V

Realisation of four 'squeezers'
E = Net field direction
a) +/− π/4 to vertical
b) +/− π/4 to horizontal

OPTICAL SIGNAL CONTROL METHOD AND APPARATUS

FIELD OF THE INVENTION

The present invention relates to optical signal control methods and apparatus. The invention relates in particular, but not exclusively, to apparatus for processing one or more optical signals to produce a desired polarisation transformation on a Poincaré sphere; to apparatus for adjusting the state of polarisation of one or both of two optical signals to achieve a chosen relationship between the states of the signals; and to apparatus for varying the state of polarisation of an optical signal by producing a desired polarisation transformation on the Poincaré sphere; and to equivalent methods.

BACKGROUND AND SUMMARY OF THE INVENTION

A coherent optical communication system transmits information by modulating the phase, frequency or amplitude of an optical signal traveling down an optical fibre. At the receiving end of the fibre the information is recovered by interfering the arriving optical signal with a reference light beam produced by a local oscillator laser. For the two beams to combine effectively their polarisation states must be matched. Unfortunately the polarisation state of the received light may vary unpredictably with time owing to small disturbances to the optical fibre through which the signal has travelled. To avoid loss of transmitted information it is therefore necessary to transform the polarisation state of either the signal or the local oscillator so that their polarisation states are matched, and also to vary this transformation as the polarisation states of the signal and local oscillator change. A complete polarisation control system therefore requires transducers capable of altering the polarisation state of a light beam, and an algorithm designed to control the transducers so that polarisation matching can always be achieved. Most effort before now have concentrated on the transducers alone. Previous schemes have been based on fibre squeezers, fibre cranks and loops, and Faraday rotation, but none of the schemes proposed satisified all the requirements of coherent transmission systems.

One specical problem that has to be addressed by polarisation control schemes for optical communications is that of tracking a randomly varying polarisation state without encountering a range limit of the transducers. Cranks and loops can be arranged to provide endless control, although they are mechanicallly cumbersome and hence rather slow. More recently it has been proposed that three linearly birefringent elements and one circularly birefringent element provide endless control when cascaded together in series. A system using five squeezers to provide endless control has been demonstrated, although only four of these were required if either the input state or the output state were fixed.

Before setting out the present invention, it is useful to introduce the Poincaré sphere as a tool for visualising transformations of polarisation states caused by birefringent elements.

Circularly symmetric single mode optical fibre is not strictly single mode, but supports two degenerate modes. If propagation along the fibre is in the Z direction then it is convenient to chose these two modes as those with the electric fields polarised in the X (horizontal) and Y (vertical) directions. Any propagation mode supported by the fibre may be represented as a sum of these two principle modes. In loose terms the electric field can be split into a horizontal component, Ex, and a vertical component, Ey, as shown in FIG. 1. The complete field is specified by the amplitude and phase of both Ex and Ey. The polarisation of the light in the fibre is determined by the *relative* phase and amplitude of Ex and Ey; it does not depend on the *absolute* phase of the signal or the total power in the signal. The polarisation state can therefore be determined by a single complex number $\sigma$ defined as $$\sigma = Ey/Ex \tag{1}$$

where $E_x, E_y$ are the complex amplitudes of the vertical and horizontal components. Two diagramatic representations of a polarisation state are useful, namely the polarisation ellipse and the Poincaré sphere. The polarisation ellipse is the ellipse traced out by adding horizontal and vertical vectors varying with time as $$Re(Ex\, exp(jwt)) \text{ and } Re(Ey\, exp(jwt)) \tag{2}$$

respectively. FIG. 2 shows a polarisation ellipse with major and minor axes $a_s$ and $b_s$ aligned at an angle $\phi$ to the horizontal and vertical axes. The azimuth $\phi$ and the degree of ellipicity $\psi$, defined as $$\psi = \pm \arctan(b_s/a_s), \tag{3}$$

characterise the polarisation state completely. If $\psi = 0$ then the polarisation ellipse collapses to a line to give a linear polarisation state at an angle $\phi$ to the horizontal axis, whereas if $\psi = \pm\pi/4$ then the left circular or right circular polarisation states are obtained.

The Poincaré sphere, as shown in FIG. 3, is an alternative representation of polarisation states. A polarisation state S with azimuth $\phi$ and ellipicity $\psi$ is represented by a point on the unit sphere with longitude $2\phi$ and latitude $2\psi$. All linear states lie on the equator, with the points H and V corresponding to horizontal and vertical states and points P and Q corresponding to states aligned at $+\pi/4$ and $-\pi/4$ to the horizontal fibre axis. Point L represents the left circular and point R right circular polarisations.

The Poincaré sphere is particularly useful for describing the behaviour of birefringent elements. It can be shown that all birefringent elements transform polarisation states as rotations on the Poincaré sphere. To illustrate this consider a fibre, shown in FIG. 4a, to which squeezing has been applied in the vertical direction. The stress induced in the fibre causes a different effective refractive index to be presented to the horizontal and vertical electric fields, so that these travel with a slightly different phase velocity. After traversing a length of this fibre the horizontal and vertical components appear with different phase. The fibre is said to be birefringent and, in general, it will change the polarisation state of light tramsitted through it. FIG. 5 shows how the polarisation state moves on the Poincaré sphere. The birefringence between the horizontal and vertical polarisation states (H and V on the sphere) rotates any input state S about axis HV to an output state S'. The angle of rotation $\theta$ on the sphrer is equal to the phase difference introduced between the horizontal and vertical states on travelling through the fibre. In this example the horizontal and vertical states (H and V)

are not affected by the rotation, so if the light is initially in either of these states it will remain so as it travels down the fibre.

In a similar way, squeezing applied at $\pm \pi/4$ to the fibre, shown in FIG. 4b, causes birefringence between the linear states aligned at $\pm \pi/4$ to the horizontal axis. This is represented on the sphere as a rotation about the axis QP, through an angle which equals the phase difference induced between these two states. In general, squeezing the fibre at any angle $\gamma$ to the horizontal causes a rotation on the sphere about an axis lying in the equatorial plane with a longitude of $2\gamma$.

Another case of interest is circular birefringence where the rotation is about the vertical axis LR. The Faraday effect gives rise to circular birefringence when a fibre is placed in a region of strong magnetic field.

Practical birefringent elements used to adjust or control polarisation separate broadly into two types. The first type includes the squeezing elements just discussed. These have the axes of rotation fixed and vary the amount of birefringence (the angle of rotation on the sphere) to adjust the output polarisation. The second type includes half-wave plates and quarter-wave plates used in bulk optics. These have the amount of birefringence fixed (by the thickness of the plate) and vary the rotation axis by rotating the element in space. Using a combination of fractional-wave elements ($\frac{1}{4},\frac{1}{2},\frac{1}{4}$) or a combination of squeezers (0, $\pi/4$, 0) it is possible to transform any polarisation state to any other state.

According to the present invention in a first main aspect there is provided apparatus for processing one or more optical signals to produce a desired polarisation transformation comprising at least one variable birefringent device adapted to provide a rotation of variable amount on the Poincar/é sphere about an axis, or effective axis, of rotation whcih itself may be varied in direction in a plane which passes through the origin of the Poincaré sphere, and control means adapted to vary the amount of rotation on the Poincaré sphere produced by the birefringent device, and to vary the direction of the axis or effective axis about which the rotation takes place, so as to achieve the desired polarisation transformation.

In preferred forms, the control means is arranged to vary the direction of the axis of rotation on the Poincaré sphere in such a manner as to maintain below a chosen value the amount of birefringence introduced by the birefringent device to achieve the desired polarisation transformation, most preferably in such a manner as to minimise the amount of birefringence introduced by the birefringent device to achieve the desired polarisation transformation.

Preferably the control means is arranged to vary the direction of the axis of rotation on the Poincar/é sphere in such a manner as to prevent substantially the magnitude of the birefringence introduced by the device exceeding $2\pi$ or a chosen miltiple of $2\pi$. In one preferred form, the control means is adapted to detect any inctrease of the magnitude of birefringence introduced by the device beyond $2\pi$ or a chosen multiple of $2\pi$, and upon such detection to rotate the axis of rotation of the device on the Poincare sphere through an angle of magnitude of $\pi$ or an odd multiple of $\pi$. This detection may be achieved in a number of ways. In one form the control means is adapted to detect when a transformation has been introduced such that a rotation of the said axis of rotation has no effect on the relationship between the initial and final states of polarisation between which the transformation has taken place. In another form the variable birefringent device is calibrated to allow the control means to detect when a birefringence of magnitude of $2\pi$ or a chosen multiple of $2\pi$ has been introduced by the device.

In most practical embodiments, it will be arranged that the said variable birefringent device is capable of producing rotation on the Poincaré sphere up to a finite limit, but is capable of endless rotation of the axis, or effective axis, of rotation by which the device effects change of polarisation state on the Poincaré sphere.

In one application of the invention, the control means is adapted to produce a polarisation transformation from a fixed and known state of polarisation of circularly polarised light to a state of polarisation which varies with time, the birefringent device being capable of endless rotation of the direction of its axis of rotation on the Poincaré sphere, in some arrangements, the birefringent device being capable of a maximum rotation on the Poincaré sphere of $\pm \pi$.

In another more usual application of the invention, the control means is adapted to produce a polarisation transformation from a first state of polarisation which varies with time to a second state of polarisation which varies with time, the birefringent device being capable of endless rotation of the direction of its axis of rotation on the Poincaré sphere, conveniently the birefringent device being capable of a maximum rotation on the Poincaré sphere of $\pm 2\pi$.

In accordance with one particularly important feature of the invention, there are provided first and second variable birefringent devices, each adapted to provide a rotation of variable amount on the Poincaré sphere about an axis, or effective axis, of rotation which itself may be varied in direction in a plane which passes through the origin of the Poincaré sphere, means for assessing the desired polarisation transformation, and control means adapted to vary the birefringent devices in response to an output from the said assessing means, in which the control means is adapted to effect the required transformation in normal operation by varying one of said devices, and is adapted to detect when the said one device reaches a limit of birefringence, and thereafter to effect the required transformation by varying the previously non-operative device, while at the same time progressively reducing the birefringence introduced by the previously operative device.

In accordance with one particularly important application of the invention, the apparatus is arranged for adjusting the state of polarisation of one or both of two optical signals to achieve a chosen relationsip between the states of the signals, the apparatus including means for assessing the relationship between the polarisation states of the two signals after the said polarisation transformation, and the control means being adapted to vary the birefringent device in response to an output from the said assessing means.

In a particularly preferred form of this arrangement, the apparatus includes a second variable birefringent device adapted to provide a rotation of variable amount on a Poincaré sphere about an axis of rotation which itself may be varied in direction in a plane which passes thropugh the origin of the Poincaré sphere, in which the control means is adapted to effect the required transformation in normal operation by varying one of said devices to track changes in the states of polarisation of one or both of the optical signals. In accordance with a preferred feature, the control means is adapted to control the non-tracking device so as to reduce any birefringence being produced by the non-tracking device.

Another preferred feature of this form of the invention is that the control means may be adapted to detect when the tracking device reaches a limit of birefringence, and thereafter to effect the required transformation by varying the previously non-tracking device, which then becomes the actively tracking device, while at the same time progressively reducing the birefringence introduced by the previously tracking device, which has now become the non-tracking device, away from the said limit.

Preferably the control means is adapted to reduce the birefringence introduced by a non-tracking device until either that birefringence reaches zero or until the other, tracking, element reaches a limit of birefringence, whereupon in either eventuality the control means interchanges the functions of the two elements.

In some arrangements it is possible to operate the apparatus when each device is capable of producing a rotation on a Poincaré sphere of a magnitude of slightly more than $\pi$ or a chosen multiple of $\pi$, and the control means is set to interchange the functions of the two elements if either element reaches a state where it introduces a rotation of magnitude of $\pi$ or a chosen multiple of $\pi$ on the Poincare sphere. However a more robust system is obtained when each device is capble of producing a rotation on a Poincaré sphere of a magnitude of slightly more than $2\pi$ or a chosen multiple of $2\pi$, and the control means is set to interchange the functions of the two elements if either element reaches a state where it introduces a rotation of magnitude of $2\pi$ or a chosen multiple of $2\pi$ on the Ponicare sphere.

In some forms of the invention, it may be arranged that the control means repeatedly exchanges the tracking and non-tracking devices so as to maintain the birefringence of both devices below a chosen limit.

In general, in the description of the invention above, reference has been made to the axis of rotation on the Poincaré sphere or to the effective axis. In many arrangements, the polarisation transformation can be represented as taking place about an axis on the Poincaré sphere which is varied in direction. In other arrangements the same effect may be produced, but by a series of infinitesimal, or very small, rotations about two distinct axes giving rise to a net rotation about an effective axis lying substantially in the plane of the said two axes.

Thus in accordance with one form of the invention, it may be arranged that the birefringent device is adapted to provide a series of small rotations on a Poincaré sphere about a first axis of rotation, and a series of small rotations about a second axis, and to alternate rapidly between rotations of the two series so as to give an effect equivalent to a rotation about a third, effective, axis, the control means being adapted to vary the relative amounts of the said small rotations of the said two series in such a manner as to vary the direction of the said effective axis. Conveniently, the said first and second axes may be orthogonal.

To summarise in general, there may be provided in accordance with the present invention a birefringent element in which both the amount of birefringence and the axis of rotation on the Poincaré sphere can be varied. The element may provide linear birefringence at any angle in space so that rotation about any axis in the equitorial plane of the Poincaré sphere is possible. Further, the angle in space may itself rotate without limit. For a fibre squeezer this would in principle be achieved by rotating the squeezers around the fibre, although this may not be possible in practice. The total amount of bvirefringence about any one axis may, however, be limited, this corresponding to a maximum squeezing pressure on the fibre.

Next, in accordance with a second main aspect of the present invention, there is provided a particular form of variable birefringent device, suitable for use in the appratus set out above. In this particularly preferred form, the or each variable birefringent device comprises a waveguide formed of electro-optic material, and input means for producing in the electro-optic material an electric field of variable strength and variable orientation, the control means being adapted to vary the amount of rotation on the Poincaré sphere by varying the strength of the electric field in the electro-optic material, and to vary the direction of the axis of rotation on the Poincaré sphere by varying the orientation of the electric field in the electro-optic material. Conveniently, the input means are arranged to apply to the electro-optic material two orthogonal electric fields both at right angles to the direction of propagation of light through the material, the control means being arranged to vary the strengths of the two orthogonal electric fields in such a manner as to vary the strength and orientation of the net electtric field in the material.

Preferably the electro-optic material has substantially the same refractive index in all directions perpendicular to the direction of propagation of light. However, the waveguide in the said electro-optic material may include a residual birefringence independent of any applied electric fields, and the input means may be arranged to apply a corrective voltage to counteract the residual birefringence, in addition to the application of the varying electric fields to achieve the required transformation on the Poincare sphere. Alternativelyy, the residual birefringence may be overcome by offsetting the direction of propagation of light slightly from the crystalographic axes of the electro-optic material.

It is particularly preferred that the electro-optic material is lithium niobate, for example the or each birefringent device may comprise a z-propagating waveguide diffused into a lithium niobate substrate.

Conveniently the input means may comprise at least three elongate electrodes arranged symemtrically over the waveguide, two outer electrodes being positioned one on either side of the waveguide and being arranged to provide a first electric field in the waveguide by a potential difference between the outer electrodes, and one or more central electrodes being arranged to provide a second electric field substantially at right angles to the first electric field in the electro-optic material, by means of a potential difference between the central electrode or electrodes, and the two outer electrodes.

Alternatively it may be arranged that the input means comprises a plurality of parallel electrodes extending generally along the length of the wave guide, but arranged to cross to and from across the waveguide repeatedly, the arrangement being such that in effect two orthogonal electric fields are distributed uniformly along the length of the waveguide, and can be varied by the control means.

Although the particular form of variable birefringent device discussed above has been set out in the context of the first aspect of the present invention, it is to be appreciated that such a variable birefringent device is versatile, and may be used for other purposes in the field of polarisation control.

In accordance with a first further aspect of the invention there may be provided apparatus for adjusting the state of polarisation of one or both of two optical signals to achieve a chosen relationship between the states of the signals, comprising first and second variable birefringent devices, each adapted to provide a rotation of variable amount on the Poincaré sphere about an axis, or effective axis, of rotation which itself may be varied in direction in a plane which passes through the origin of the Poincaré sphere, means for assessing the relationship between the polarisation states of the two optical signals after the transformation, and control means adapted to vary the birefringent devices in response to an output from the said assessing means, in which the control means is adapted to effect the required transformation in normal operation by varying one of said devices, and is adapted to detect when the said one device reaches a limit of birefringence, and thereafter to effect the required transformation by varying the previously non-operative device, while at the same time progressively reducing the birefringence introduced by the previously operative device.

In accordance with a second further aspect of the invention there may be provided apparatus for procesisng one or more optical signals to produce a desired polarisation transformation comprising at least one variable birefringent device adapted to provide a series of small rotations on a Poincaré sphere about a first axis of rotation, and a series of small rotations about a second axis, and to alternate rapidly between the rotations of the two series so as to give an affect equivalent to a rotation about a third, effective, axis, and control means adapted to vary the cumulative amounts of the small rotations so as to vary the total rotation on the Poincaré sphere, and to vary the relative amounts of the small rotations of the said two series so as to vary the direction of the said effective axis.

In accordance with a third further aspect of the invention there may be provided apparatus for processing one or more optical signals to produce a desired polarisation transformation comprising at least one variable birefringent device adapted to provide a rotation of variable amount on the Poincaré sphere about an axis, or effective axis, of rotation which itself may be varied in direction, in a plane which passes through the origin of the Poincaré sphere and control means adapted to vary the amount of rotation on the Poincare sphere produced by the birefringent device, and to vary the direction of the axis, or effective axis, about which the rotation takes place, so as to achieve the desired polarisation transformation, in which the control means is adapted to detect any increase of the magnitude of birefringence introduced by the device beyond $2\pi$ or a chosen multiple of $2\pi$, and upon such detection to rotate the axis, or effective axis, of rotation of the device on the Poincare sphere through an angle of mangitude of $\pi$ or an odd multiple of $\pi$.

In accordance with a fourth further aspect of the invention there may be provided apparatus for varying the state of polarisation of an optical signal by producing a desired polarisation transformation comprising, at least one variable birefringent device comprising a wavegiuide formed of elctro-optic material and an input means for producing one or more variable electric fields in the electro-optic material, and control means adapted to vary the strength and/or orientation of the electric fields so as to vary both the magnitude of the birefringence of the waveguide and the effective axis of the birefringence represented on the Poincaré sphere, so as to achieve a desired polarisation transformation.

BRIEF DESCPRIPTION OF THE DRAWINGS

Embodiments of the invention will now be described by way of example with reference to the accompanying drawings in which:

FIG. 31 shows in diagrammatic form a series of arrangements whereby a number of variable birefringent elements can be arranged along a solid state waveguide device, embodying the present invention;

DETAILED DESCRIPTION OF THE DRAWINGS

Figure 1:
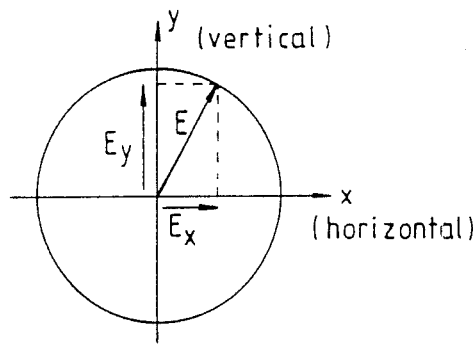
FIG. 1 is a representation of an electric field split into horizontal and vertical components.
Figure 2:
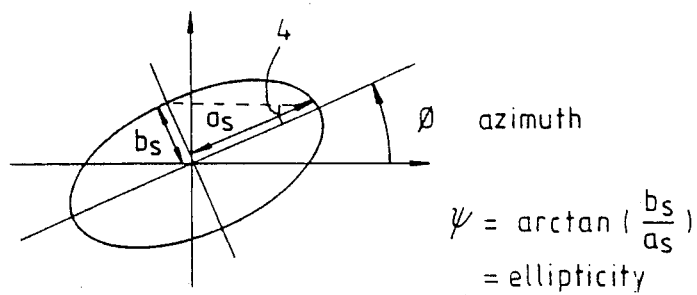
FIG. 2 is a representation of a state of polarisation on a polarisation ellipse.
Figure 3:
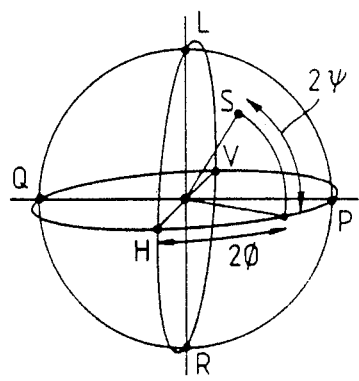
FIG. 3 is a representation of a Poincaré sphere showing a state of polarisation S as a point on the sphere.
Figure 5:
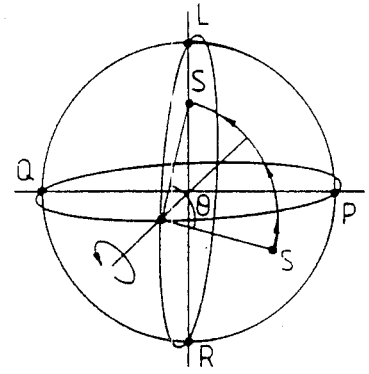
FIG. 5 is a representation of a Poincaré sphere showing a polarisation state moving from a point S to a point S' on the sphere.
Figure 4A:
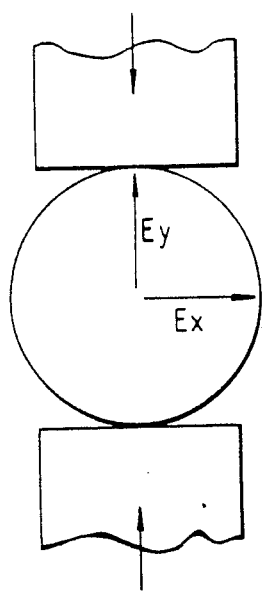
FIGS. 4a and 4b show diagrammatic representations of birefringence induced by squeezing a fibre, FIG. 4a showing that birefringence occurs between horizontal and vertical linear fields, and FIG. 4b showing that birefringence occurs between linear statese at $\pm\pi/4$ to the horizontal axis.
Figure 4B:
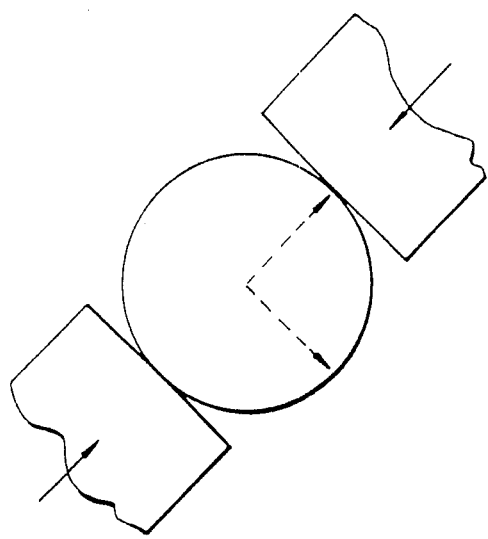
Figure 6A:
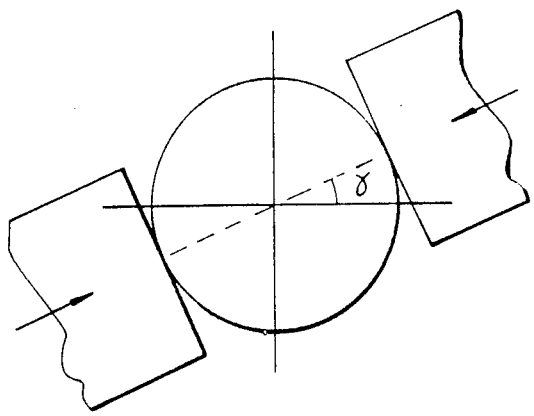
FIG. 6a is a representation of a fibre squeezed at an angle to the horizontal.
Figure 6B:
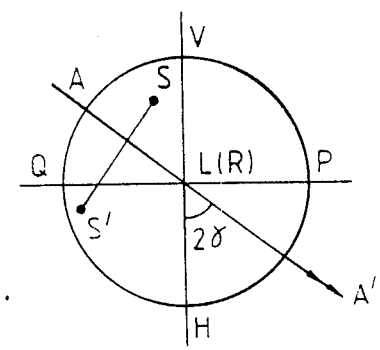
FIG. 6b shows the corresponding rotation on a Poincaré sphere, viewed in plan view, the figures relating to an embodiment of the present invention.

It is convenient to describe first the effect of a birefringent element in an embodiment of the invention, with reference to a plan view of the Poincaré sphere, shown in FIG. 6b. FIG. 6a shows schematically a fibre squeezed at an angle $\gamma$ to the horizontal, and FIG. 6b shows the corresponding rotation on the Poincaré sphere. The axis of rotation lies in the equatorial plane at an angle $2\gamma$ to the line HV, and is labelled AA'. An input polarisation state S to the birefringent element is transformed to state S' by a rotation which appears as a straight line when viewed from above.

By suitable choice of the axis of birefringence (the angle $\gamma$) and the amount of birefringence ($\theta$ say) it is possible to transform any input state to any output state using this element.

There will now be described a system for providing endless control of polarisation when producing a transformation from or to one time varying state.

It is possible, in principle, to provide endless control with a single element embodying the invention, whilst allowing both the input and output polarisation states to vary arbitrarily with time. However, it is useful to consider first the case when only one state varies and the other is fixed. This situation could well be encountered in a practical system where, for example, the polarisation state of the local oscillator is known and constant but that of the received signal may vary arbitrarily.

Figure 7A:
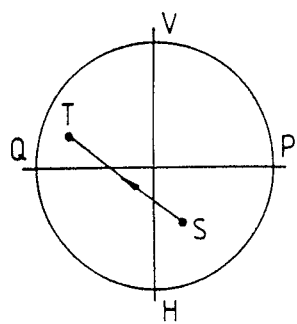
FIGS. 7a to 7h show a series of plan veiws of a Poincaré sphere, illustrating movements on the sphere during polarisation transformation in an embodiment of the present invention.
Figure 7B:
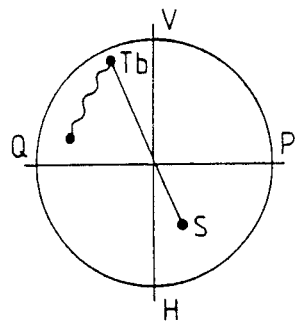
Figure 7C:
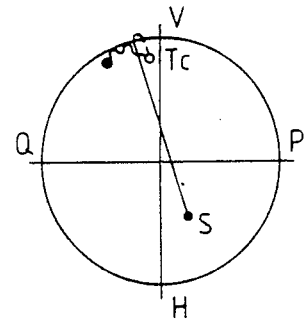
Figure 7D:
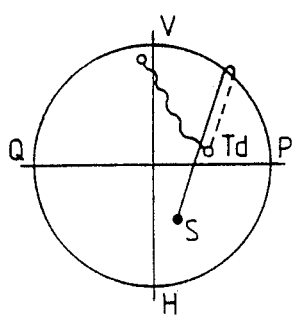
Figure 7E:
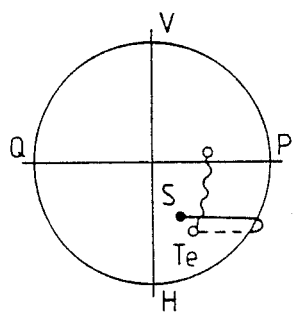
Figure 7F:
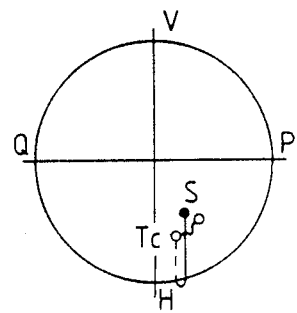
Figure 7G:
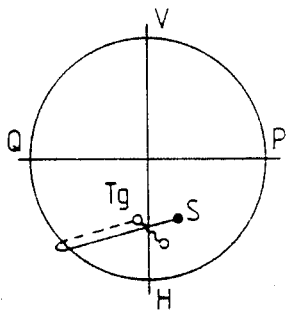
Figure 7H:
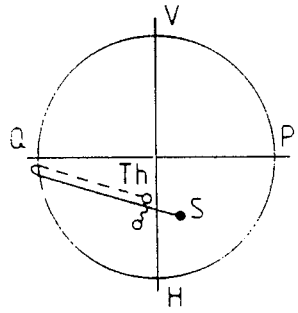
Figure 8:
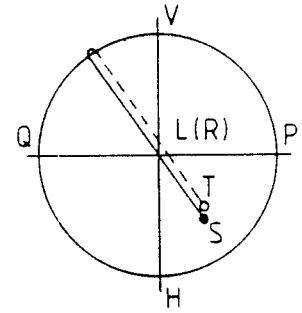
FIG. 8 is a representation of a Poincaré sphere viewed from above illustrating a transformation explanatory of the present invention.

Consider an arbitrary but fixed input state S lying on the upper hemisphere of the Poincaré sphere shown in FIG. 7a. The transformation (rotation on the sphere) to the output state T appears as a straight line when viewed from above. The angle $\gamma$ of the axis is then determined by S and T (to $\pm \pi$) and is not shown in the diagram. The rotation angle $\theta$ is also fixed and in this case is chosen to be less than $\pi$. Now assume that point T (only) varies with time. Let it follow a path traced in the series of diagrams in FIG. 7 through the points Ta-Tb on the upper hemisphere and Tc-Th on the lower hemisphere. The birefringent element can follow this motion, and the intermediate transformations to points Ta-Th are shown. At no time does the amount of birefringence $\theta$ exceed $2\pi$. It can be seen that, provided the output state T never lies directly underneath S on the Poincare sphere, this element will follow any path traced out by T without exceeding a birefringence limit determined by the position of the state S. The birefringence reaches this limit for the situation shown in FIG. 8, where state T lies nearly underneath S and the circle of rotation passes through points L and R. For all input states S the birefringence limit is $2\pi$ or less, with equality only if S lies on the equator.

Figure 9:
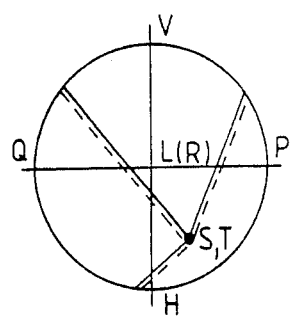
FIG. 9 is a representation of a plan view of the Poincaré sphere, showing a polarisation transformation of the present invention in which the final state is positioned immediately underneath the initial state on the Poincaré sphere, and shows allowed rotations to achieve this.
Figure 10A:
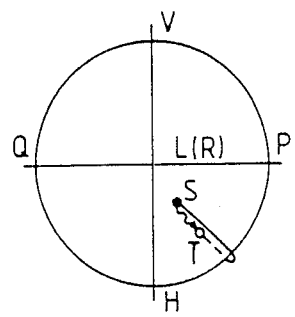
FIGS. 10a and 10b are representations of Poincaré spheres in plan view showing two ways in which a polarisation state can move away from the state shown in FIG. 9, in FIG. 10a decreasing birefringence, and in FIG. 10b increasing birefringence.
Figure 10B:
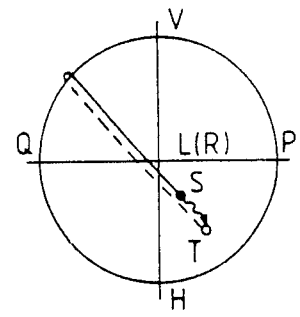
Figure 11A:
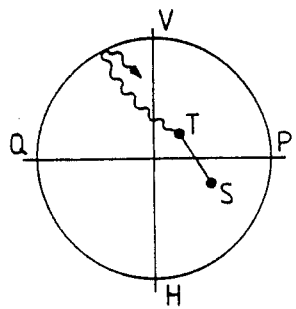
FIG. 11 shows a sequence of polarisation transformations explanatory of the invention, for tracking between two time-varying states, illustrated by plan views of Poincaré spheres.
Figure 11B:
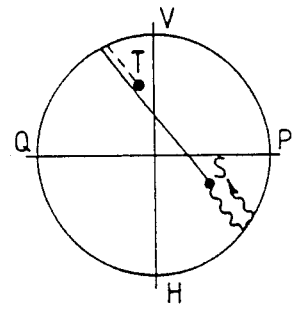
Figure 11C:
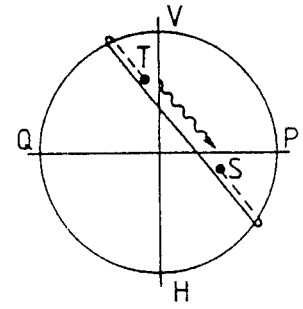
Figure 11D:
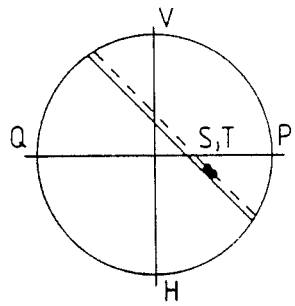

It was stated above that the output state T should not lie exactly underneath input state S on the Poincaré sphere. If this occurs then there are many possible allowed rotations from S to T, as shown in FIG. 9. If T varies away from this position then there are two alternative courses of action the controller can take. One of these decreases the total birefringence required, whereas the other increases the total birefringence and is undesirable. The two situations are shown in FIGS. 10a and 10b respectively. If the birefringence increases (FIG. 10b) then it is not possible to remedy the error until T again lies directly underneath S, which is an unlikely occurance given the random nature of polarisation fluctuations. In this situation there becomes a danger that state T may vary such that the birefringent element reaches a range limit.

A special case of interest occurs if the input state is known to be one of the circular states (L or R). The maximum birefringence required from the element is then only $\pi$, regardless of the motion of the output state.

There will now be described a system for providing endless control of polarisation when producing a transformation between two time varying states.

Figure 12:
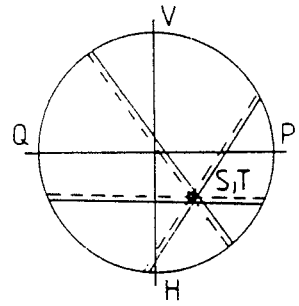
FIG. 12 is a plan view of a Poincaré sphere where the final and initial states co-incide, showing the allowed rotations to achieve this.

The element can also provide endless control if both the input state S and the output state T vary with time, although in this case the birefringence limit is always $2\pi$. The sequence in FIG. 11 shows how S and T may vary such that this limit is reached. At this stage S and T coincide and there are many allowed rotations from S to T, as shown in FIG. 12. The controller has a choice of whether to increase or decrease the total birefringence when S and T move apart. Decreasing the birefringence ensures continuous control is maintained.

If the transfer characteristics of the birefringent element (birefringence induced against input voltages) were known accurately then operating limits could be imposed on the voltages to ensure that the birefringence never exceeded $2\pi$, and continuous control would always be maintained. In practice this may not be possible and some 'weighting' strategy may have to be adopted to maintain the birefringence below $2\pi$. If, owing to insufficiencies in such a control strategy, the birefringence of the element exceeds $2\pi$ then it is not possible to reduce the birefringence less than $2\pi$ until S and T coincide again. The scheme is therefore not very robust when the birefringence is close to $2\pi$, unless an accurate operating limit of $2\pi$ can be imposed. A more robust control can be provided using two elements in series.

There will now be described a system for providing endless control of polarisation in a robust practical system utilising two variable birefringent elements.

Figure 13A:
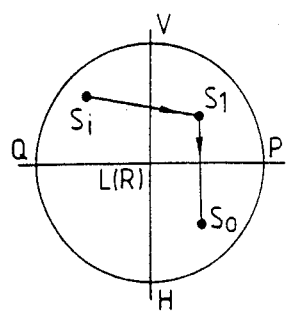
FIG. 13 shows a combined polarisation transformation on a Poincaré sphere for two linearly birefringent elements arranged in series.
Figure 13B:
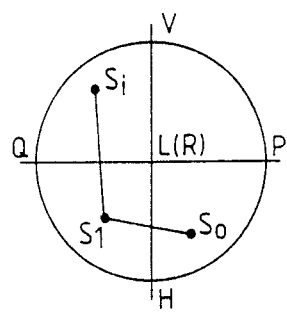
Figure 14A:
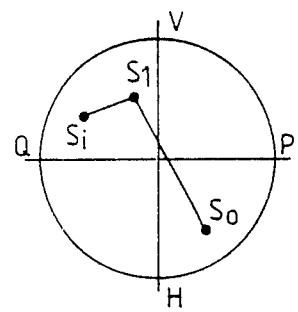
FIG. 14 shows in diagrams a to f how the birefringence of a first element can be reduced or increased continuously without exceeding a range limit on the second element, illustrated on a series of Poincaré spheres in plan view.
Figure 14B:
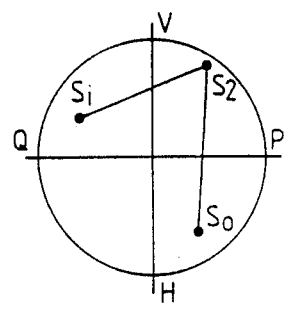
Figure 14C:
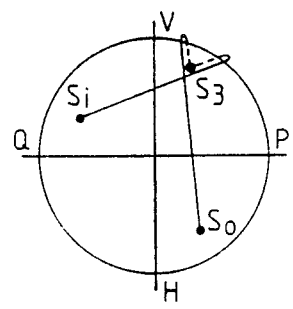
Figure 14D:
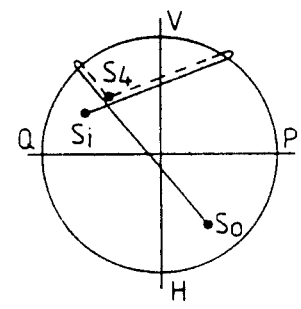
Figure 14E:
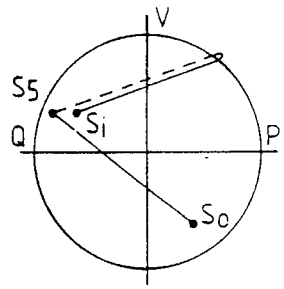
Figure 14F:
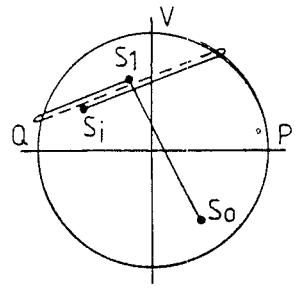

Considering two of these birefringent elements in series, FIG. 13 shows the combined polarisation transformation on the Poincaré sphere. The input state $S_i$ is transformed by the first element to state $S_1$ and $S_1$ is transformed by the second element to output state $S_o$. The intermediate state $S_1$ may lie anywhere on the sphere, and two possibilities are shown in FIG. 13. As will be shown shortly, this arrangement provides a mechanism to reduce the amount of birefringence in either element without affecting the overall polarisation matching. It thereby provides a more robust control.

FIG. 14 shows how the birefringence of the first element can be reduced or increased continuously without exceeding a range limit on the second element. Initially the intermediate state is $S_1$. The birefringence of the first element can be increased so that the intermediate state moves through $S_1$, $S_2$ on the upper hemisphere, $S_3$, $S_4$ on the lower hemisphere and then returns via $S_5$ to $S_1$. After this procedure the birefringence of the first element has increased by $2\pi$ but the birefringence of the second element has returned to the value it had before the 'winding' procedure started. The amount of birefringence can also be decreased by exactly the same procedure, therefore allowing the first element to be 'unwound'. The roles of the first and second elements can be interchanged to allow the second element to be unwound.

The unwinding procedure allows implementation of a more robust control strategy than can be achieved with a single element. A simple strategy would be as follows. Element 2 is set to zero birefringence (so states $S_1$ and $S_o$ are identical) and element 1 operates as if it were a single control element in the manner described in the previous section. Normally the total birefringence of element 1 would not exceed $2\pi$, however, an insufficiency in the practical implementation of the control may allow this range limit to be exceeded. In this case the remedial action would be to unwind element 1 following the procedure outlined in FIG. 14, with control transfered to element 2 so that the overall polarisation matching is maintained. In practice it may not be easy to detect a birefringence of exactly $2\pi$, however it is sufficient to impose nominal range limits on the total birefringence of the elements, and to start an unwinding procedure when one of these nominal limits is exceeded. A minimum range would be $\pm 2(\pi + \delta)$ where $\delta$ is a small operating margin. It is important for a robust implementation that the unwinding procedure occurs quickly compared to fluctuations in the input and output polarisation states $S_i$ and $S_o$. This ensures that, most of the time, at least one of the elements is close to zero birefringence.

The sequence shown in FIG. 14 assumes that there is no other birefringent element in between the two control elements. If both control elements provide greater than $2\pi$ birefringence, then robust control can be maintained even if they are separated by a fixed birefringent element, for example a length of optical fibre.

There will now be described a practical implementation of a control algorithm for use in embodiments of the present invention.

Figure 15:
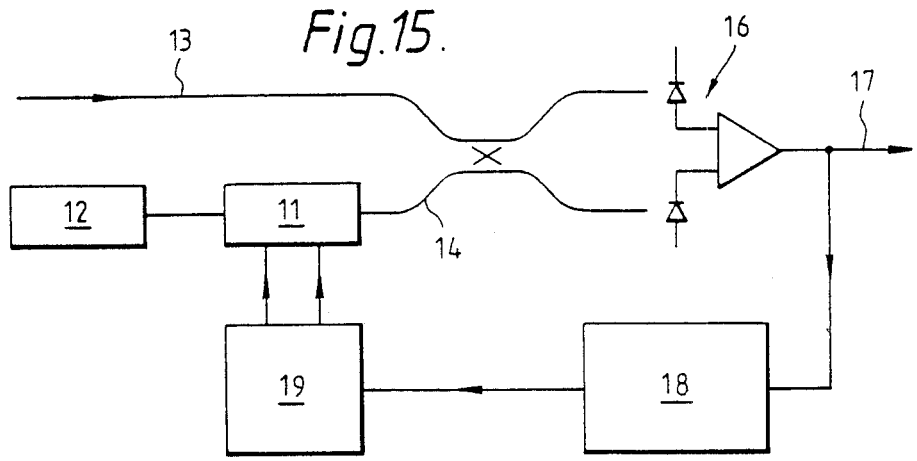
FIG. 15 is a diagrammatic representation of a polarisation controller embodying the invention for use in a coherent communication system.

In a communication receiver the polarisation controller may be operated as shown in FIG. 15. One or more birefringent elements 11 receive a polarised optical signal from a local oscillator 12, and vary the state of polarisation of the local optical signal in order to match it to a received optical signal from a remote source on a line 13. The transformed local signal is fed on a line 14 to a directional coupler 15 which compares the local and remote optical signals. A receiver 16 extracts data by interference between the two signals in the directional coupler 15, and feeds data out at a line 17. A level detector 18 detects the level of the output signal 17 and supplies a feed-back signal to a polarisation controller 19, which controls the birefringent element or elements 11. Thus the birefringent element is placed in the local oscillator arm, although in principle it could be placed in either arm, or even be split between both arms. For example, the two element controller described previously could be implemented by placing one element in the local oscillator arm 14, and the other element in the signal arm 13. Positive rotations about an axis on the Poincaré sphere produced by the element in the local oscillator arm are equivalent to negative rotations about the same axis produced by the element in the signal arm. The optical signal and local oscillator combine in the beamsplitter and are incident on the receiver. The signal strength is monitored with a level detector and this level is fed back to the polarisation controller. The controller applies voltages to the birefringent elements to maintain the polarisation match, which is identified by maximising the received signal strength. The only input information to the controller is the signal level; no direct measurement is made of the signal of local oscillator polarisation states $S_i$ or $S_o$ or the intermediate state $S_1$. The control algorithm must therefore be intelligent enough to assess correctly polarisation matching and to execute successful unwind procedures using only a single input level. This can be achieved by a technique referred to in this specification as 'dithering' the voltages applied to the birefringent elements and applying an iterative procedure to track the maximum level. By dithering is meant applying small rapid variations to the voltages about their mean values, and observing the resulting small level fluctuations, thereby giving information on the shape of the local maximum at the expense of a very small loss of signal level. For a single element, which requires two input voltages to determine its birefringence, a second order analysis of the shape of the local maximum is sufficient to avoid stabilising incorrectly on a saddle point or a minimum.

Figure 16:
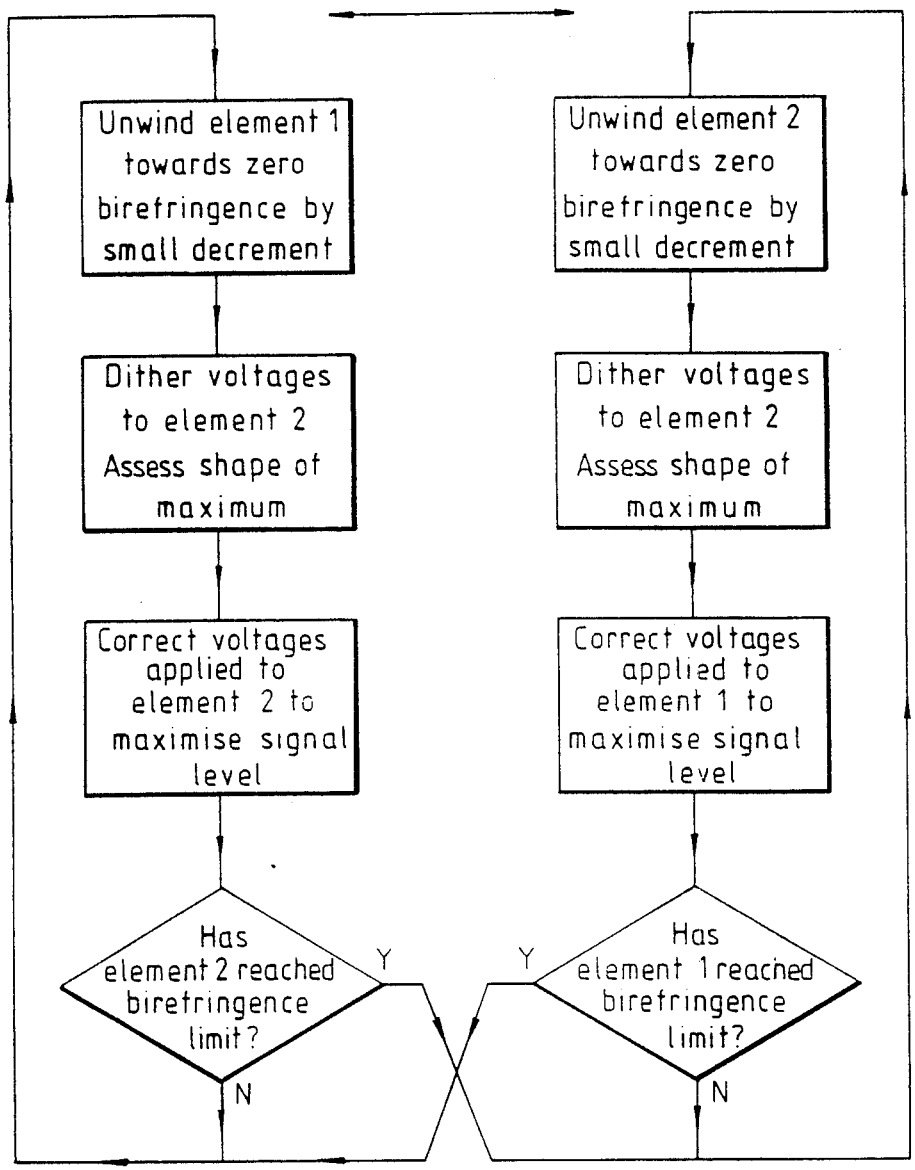
FIG. 16 is a flow diagram illustrating the implementation of a conrol strategy embodying the invention for use with the polarisation controller of FIG. 15, and also for use with other polarisation controllers embodying the invention.

The strategy for controlling two elements can be implemented using the dithering technique as shown in the flow chart of FIG. 16. The loops on either side of the chart are the same, but with the roles of elements 1 and 2 interchanged. On each cycle of the left hand loop the voltages to element 2 are dithered and subsequently corrected to maintain the maximum signal level. The total birefringence of this element is checked to see if it exceeds a range limit and if it does then dithering is transferred to element 1. Otherwise the voltages to element 1 can be adjusted a small amount on each cycle of the loop, effecting a gradual unwinding of this element towards zero birefringence. It is assumed that the motion of state $S_1$ during this unwinding process will be adequately tracked by the 'dither and correct' procedure applied to element 2 on each cycle of the loop.

Two polarisation control schemes (strategy and control algorithm) have now been described, both of which provide endless tracking of the input polarisation and the output polarisation using elements that provide $\pm 2\pi$ birefringence between any linear states. The first scheme uses only a single element but has the disadvantage that it is not robust to inadequacies in practical implementation. A second more robust scheme uses two elements. It therefore has the disadvantage of requiring twice the number of elements and twice the total birefringence. It will be seen later that devices constructed using Lithium Niobate require either high operating voltages or must be long to obtain large birefringence. It is therefore desirable to investigate the minimum birefringence required to implement a robust control scheme. It will be shown next that it is possible to operate the two element controller with only $\pm \pi$ birefringence from each element.

There will now be described the operation of a robust control system with two birefringent elements of $\pm \pi$ birefringence.

Figure 17:
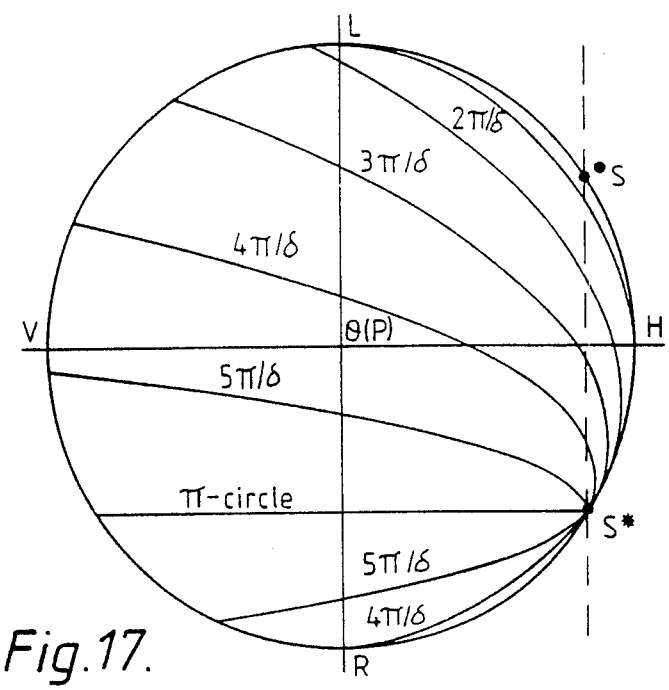
FIG. 17 is a representation of a series of contours of birefringence on a Poincaré sphere viewed from the side, and is explanatory of the present invention.
Figure 18:
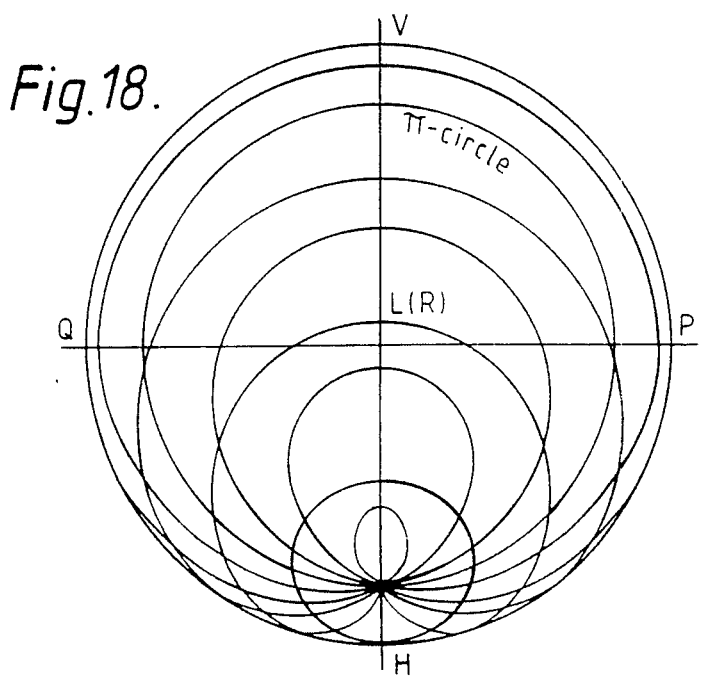
FIG. 18 is a view of the contours shown in FIG. 17, taken from above.

To show that robust control can be achieved with two elements providing only $\pm \pi$ birefringence it is first helpful to consider contours of birefringence on the Poincaré sphere. These are plotted in FIG. 17 for a sphere viewed from the side. It is assumed that the input to the birefringent element is the fixed state S. The contours are the loci of the output state $S_1$ when the birefringent axis is rotated in the equatorial plane of the Poincaré sphere, while maintaining the total amount of birefringence constant. The angle labelling each curve indicates the amount of birefringence. Every point on the sphere is accessible with less than or equal $\pi$ birefringence. A view of these contours from above is shown in FIG. 18. The contour corresponding to $\pi$ birefringence is a circle (viewed from above) that passes through the point S* on the sphere directly underneath the point S representing the input state (see also FIG. 17). As the birefringent axis goes through a complete revolution on the equator of the Poincaré sphere so the output state $S_1$ goes through two rotations on the $\pi$ birefringence circle. For every input state S the corresponding "$\pi$-circle" divides the sphere into two regions. The larger region includes S and is the region above the $\pi$-circle in FIGS. 17 and 18. The second region is that which remains, and contains point R in FIGS. 17 and 18. In the following explanation it is useful to separate the sphere into these two regions.

To implement a robust control with two birefringent elements it must be possible to unwind either element when a range limit is reached, with the other element compensating to follow variations of the intermediate state $S_1$ during the unwinding. It is therefore relevant to consider the locus of the intermediate state $S_1$ as the birefringence of one element is reduced.

Figure 19A:
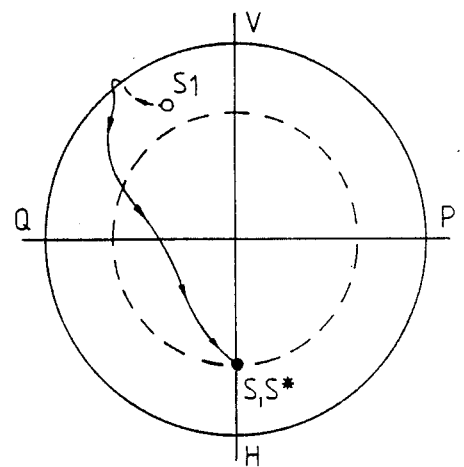
FIGS. 19a and 19b show two possible paths traced out by an intermediate state as birefringence of an element is reduced in accordance with the present invention, shown on two Poincaré spheres in plan view.
Figure 19B:
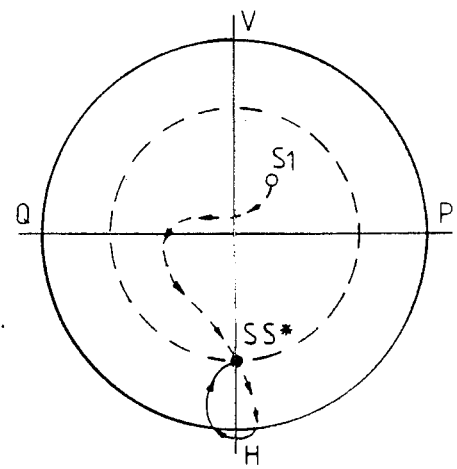

FIG. 19 shows two possible paths traced out by the intermediate state $S_1$ as the birefringence of the first element is reduced. Provided the birefringence is always less than $\pi$ then two cases can be distinguished. In FIG. 19a the intermediate state $S_1$ lies initially outside the $\pi$ circle, and in FIG. 19b $S_1$ lies initially inside the $\pi$ circle. In the first case the path is entirely outside the $\pi$ circle, and this could be guaranteed by holding the axis of birefringence constant while unwinding. In the second case the path remains within the $\pi$ circle regardless of how the amount and axis of birefringence vary, until it passes through S*, the point directly underneath S. Therefore, point S* is the only allowed exit point of the $\pi$ circle.

Figure 20:
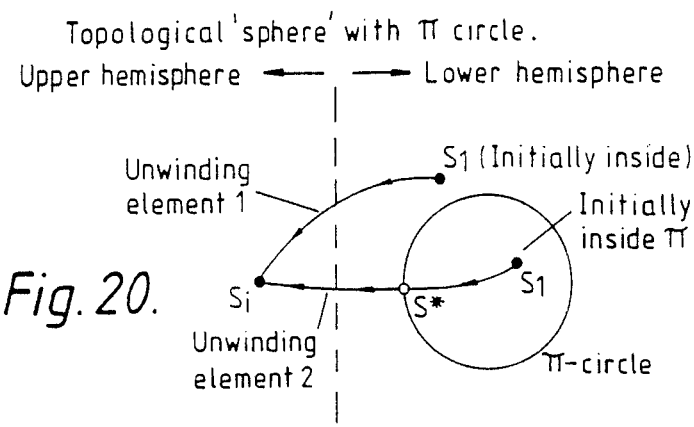
FIGS. 20 to 24 are a series of explanatory diagrams setting out various states and various areas in which they may move on Poincare spheres, and are explanatory of the operation of various embodiments of the invention.

The two distinct cases are represented topologically in FIG. 20. The upper and lower hemispheres are mapped to the left and right half planes. Point S is in the left half plane and the $\pi$ circle, shown as the closed loop, is contained entirely in the right half plane. As the first element is unwound so the intermediate state $S_1$ follows some path until it reaches $S_i$. If $S_1$ was initially inside the $\pi$ circle then, as birefringence is reduced, $S_1$ must move away from the $\pi$ circle towards the singularity S* where contours of lower birefringence meet. On further reducing the birefringence $S_1$ must eventually pass through S*.

Figure 21A:
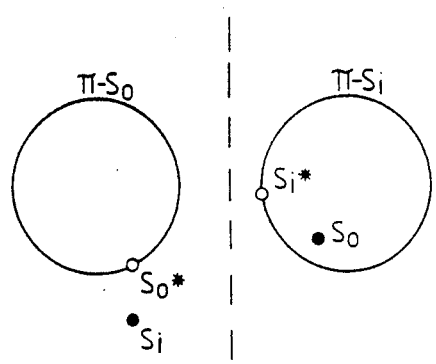
Figure 21B:
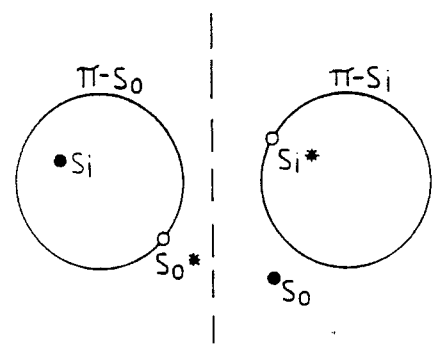
Figure 21C:
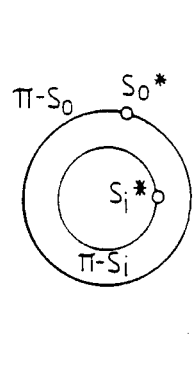
Figure 21D:
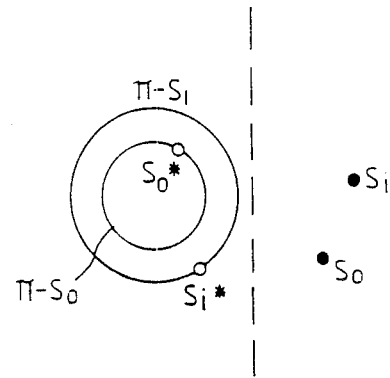

Now consider two birefringent elements. Let the input state to the first element be $S_i$, the output state from the second element be $S_o$ and the intermediate state be $S_1$. The input state $S_i$ defines a $\pi$ circle for the first element, as described above. The output state $S_o$ also defines a $\pi$ circle for the inverse transform of the second element. It is useful to consider the inverse transform of the second element as the controller is then symmetrical between the input and output states. The intermediate state $S_1$ is the 'free parameter' in the combined transform and varies while either element is being unwound. There are four topologically distinct configurations of the $\pi$ circles depending on the input and output polarisation states. These are shown in FIG. 21. If $S_i$ and $S_o$ lie in opposite hemispheres then either $S_o$ lies inside the circle $\pi$ $S_i$ (FIG. 21a) or $S_i$ lies inside the circle $\pi$ $S_o$ (FIG. 21b). If $S_i$ and $S_o$ are in the same hemisphere then either $\pi$ $S_i$ lies entirely inside $\pi$ $S_o$ or $\pi$ $S_o$ lies entirely inside $S_i$.

Figure 22A:
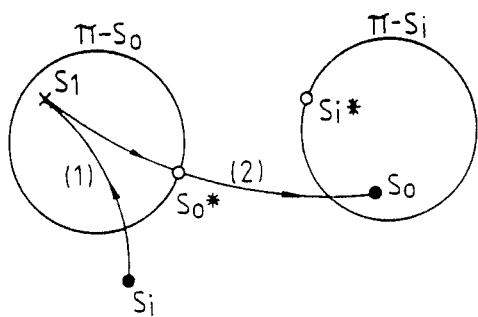
Figure 22B:
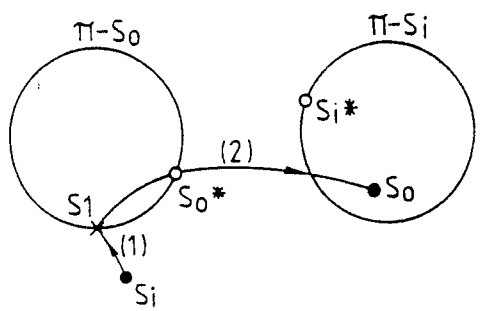
Figure 22C:
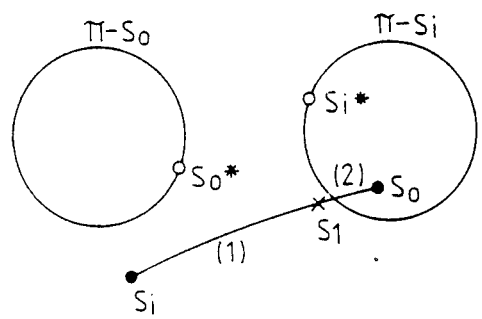
Figure 22D:
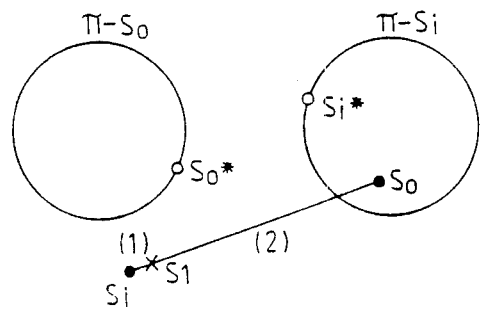

Using these diagrams it will be shown that it is always possible to unwind at least one element to zero birefringence regardless of the input, output or intermediate polarisation states. Consider the situation shown in FIG. 22a where the intermediate state $S_1$ is inside the $\pi$ $S_o$ circle at the start of the unwinding procedure. Initially the transformations of the two elements are represented by the two curves labelled 1 and 2 in FIG. 22a. Assume that it is required to set element 1 to zero birefringence, with element 2 compensating to maintain the overall polarisation match. The intermediate state $S_1$ then follows curve 1 until it reaches the $\pi$ $S_o$ circle, whereupon the second element reaches its range limit of $\pi$ birefringence, FIG. 22b. At this stage element 1 has not reached zero birefringence. The procedure can be continued by first exchanging the roles of the two elements, such that element 1 compensates to maintain the overall polarisation match. Element 2 is then unwound towards zero birefringence until element 1 reaches a range limit, as shown in FIG. 22c. Finally, after exchanging roles again, element 1 can be unwound to zero birefringence, as shown in FIG. 22d. The strategy for controlling these two elements is therefore similar to that for controlling two elements which can supply $2\pi$ birefringence: one element unwinds while the other compensates. If the compensating element reaches a range limit then the roles of the two elements are interchanged. This process is continued until one of the elements reaches zero birefringence. Note that, for the configuration $\pi$ circles shown in FIG. 22, it is not possible to unwind the second element to zero birefringence using this strategy. To do so the intermediate state $S_1$ would have to enter the $\pi$ $S_i$ circle, which can only be entered via the state $S_i^*$. The control system would require additional intelligence to achieve this.

Figure 23:
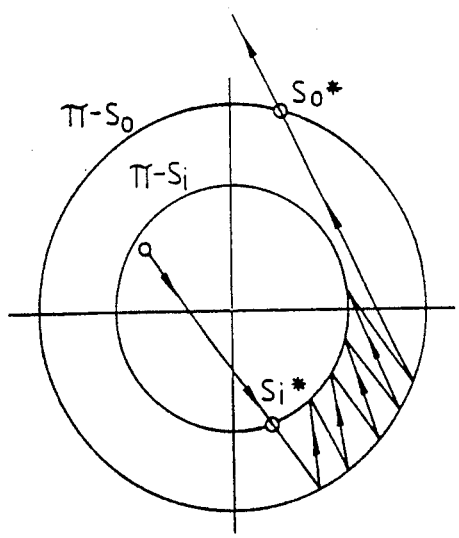

It is interesting to consider what a worst case unwinding procedure would entail. FIG. 23 shows the path traced out by the intermediate state $S_1$ if it is initially inside both $\pi$ circles. The elements change roles several times before the intermediate state escapes from both circles. However, it is unlikely that this situation would occur during normal operation of a controller because for most of the time one or other of the elements is close to zero birefringence.

The flow chart for a controller to implement this strategy is the same as that shown in FIG. 16, apart from the birefringence range limits. In operation the two cases behave differently. When using elements with only $\pi$ birefringence it may only be possible to unwind *one* of the elements completely, and this may require the roles of the elements (unwinding and compensating) to be exchanged several times before the unwinding is completed.

Figure 24:
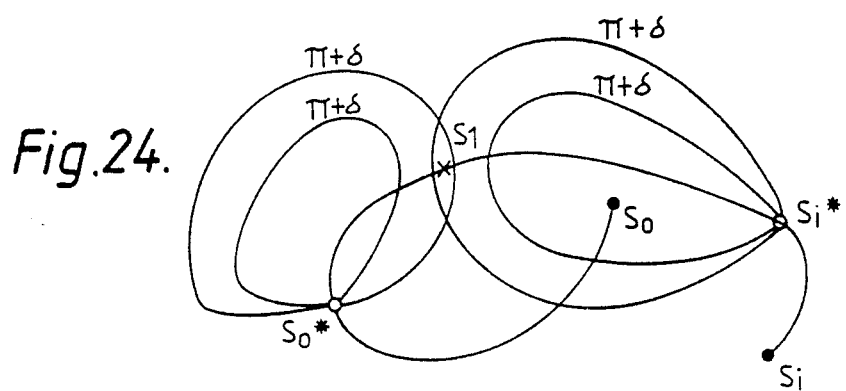

As stated earlier, it may not be possible to impose an accurate range limit of $\pi$ birefringence on either element. Indeed, if it were possible to set accurate birefringence limits then the single element controller discussed above could provide robust control and the advantage of the two element scheme is lost. In practice, therefore, each element will provide a little more, say $\delta$, than $\pi$ birefringence. This admits some situations from which it is not possible to unwind either element. FIG. 24 shows one example. Here the contours of $\pi+\delta$ birefringence (each of which is a double loop) are shown both for the input state $S_i$ and the output state $S_0$. The intermediate state $S_1$ lies inside an intersection of these two contours. This undesirable situation will be avoided if the unwinding procedure occurs much more quickly than fluctuations of the input or output polarisation states, in which case at least one the elements is always close to zero birefringence. As with the previous scheme using two elements that provide $2\pi$ birefringence, it is the *speed* of unwinding that makes the control robust. There will now be described a preferred form of birefringent element embodying the invention, particularly when utilising lithium niobate. There will be described how birefringent elements with the properties required for the above control algorithms can be fabricated using integrated optic technology in lithium niobate. Some problems forseen with the simplest implementation and their possible solutions are described.

Lithium niobate is an electro-optic material, so that its refractive index changes with an applied electric field. The conventional method of describing the electro-optic effect refers to the index ellipsoid, described by the equation:

$$B_1 x^2 + B_2 y^2 + B_3 z^2 + 2B_4 yz + 2B_5 zx + 2B_6 xy = 1.$$

For Lithium Niobate in the absence of an externally applied electric field the coefficients $B_4$, $B_5$ and $B_6$ are zero and the ellipsoid becomes $$x^2/n_1^2 + y^2/n_2^2 + z^2/n_3^2 = 1$$

where $n_1$ $n_2$ and $n_3$ are the refractive indices in the x y and z directions. For Lithium Niobate $n_1 = n_2 > n_3$.

Light propagating in the x direction can be decomposed into two linear polarisation states which have E-fields aligned along the y and z axes. The refractive index for the y-polarisation is given by the distance from the origin to the index ellipsoid along the y axis ($n_2$), and likewise for the z-polarisation ($n_3$). These two refractive indices are different so the two polarisation states propagate with different phase velocities. The material is therefore birefringent.

Figure 25:
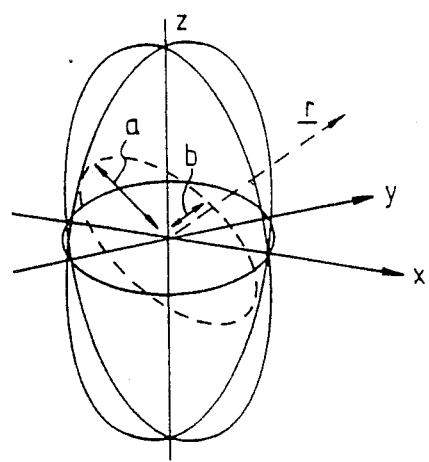
FIG. 25 is a representation of an index ellopsoid of a uniaxial crystal.

In general, light propagating in any direction in the crystal can be decomposed into two linear states, each of which 'sees' a different refractive index. The two linear states are orientated in the directions of the major and minor axes of the ellipse formed by the intersection of the index ellipsoid with a plane perpendicular to the direction of propagation of the light. FIG. 25 shows an index ellipsoid for a uniaxial crystal and the corresponding intersection ellipse for light propagating in the direction r. The corresponding principal axes a and b are also shown. The lengths of a and b give the refractive index seen by the corresponding polarisation states.

An externally applied electric field changes the B-coefficients of the ellipsoid. In general all the B-coefficients will depend on all the components of the applied field. This can be written $$\delta B_i = \Sigma r_{ij} E_j \tag{6}$$

where $\delta B_i$ is the change in that coefficient arising from the external electric field. The array of elements $r_{ij}$ is referred to as the electro-optic tensor. For Lithium Niobate the tensor is of the form $$r_{ij} = \begin{bmatrix} 0 & -r_{22} & r_{13} \\ 0 & r_{22} & r_{13} \\ 0 & 0 & r_{33} \\ 0 & r_{42} & 0 \\ r_{42} & 0 & 0 \\ -r_{22} & 0 & 0 \end{bmatrix} \tag{7}$$

where $$r_{33} = 30.8 \times 10^{-12} \text{ m/V} \tag{8}$$

$$r_{42} = 28 \times 10^{-12} \text{ m/V}$$

$$r_{13} = 8.6 \times 10^{-12} \text{ m/V}$$

$$r_{22} = 3.4 \times 10^{-12} \text{ m/V}$$

although these values are wavelength and temperature dependent.

Figure 26A:
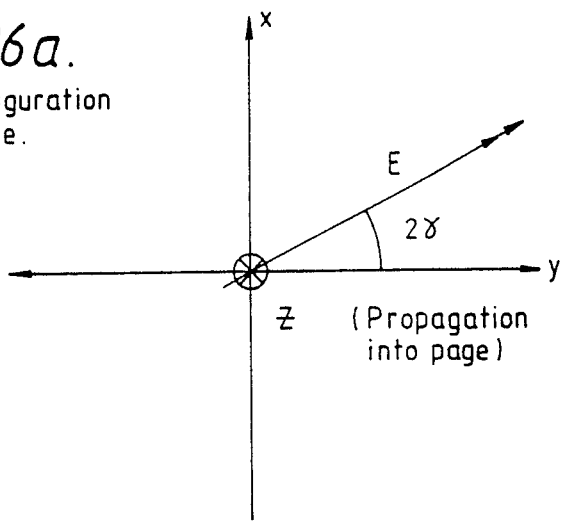
FIGS. 26a, 26b and 26c show respectively an explanatory diagram of configuration space, an index ellipsoid, and a Poincaré sphere in plan view, all expolanatory of a variable birefringent device embodying the invention and fabricated in lithium niobate.
Figure 26B:
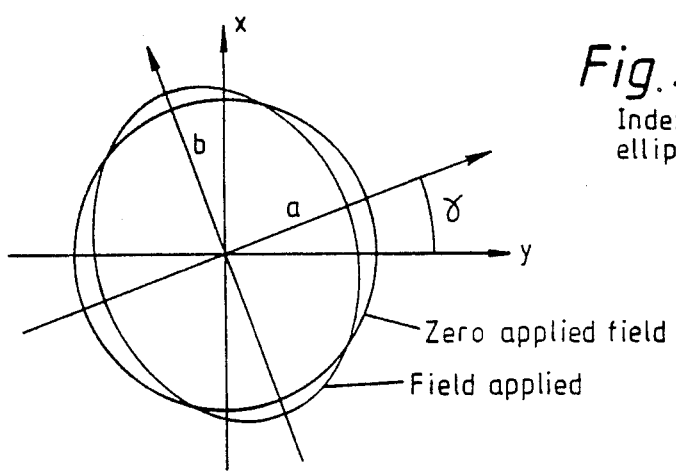
Figure 26C:
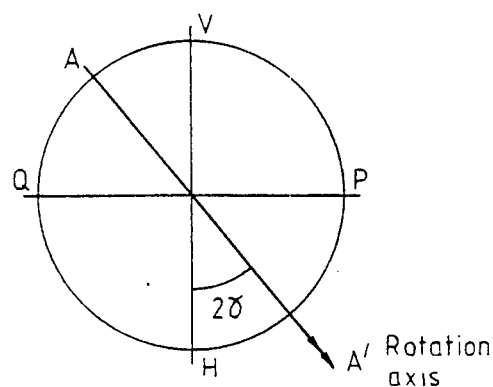

The polarisation control devices to be described operate on light propagating in the z direction. External electric fields are applied perpendicular to the direction of propagation to change the birefringence of the material. The situation is shown in FIG. 26a. In the absence of an externally applied electric field the index ellipse becomes a circle, shown in FIG. 26b, and the material displays no birefringence for light propagating in this direction. If an electric field in the x-y plane is applied at an angle $2\gamma$ to the y-axis (shown in FIG. 26) the circle becomes elliptical with the minor and major axes aligned at $\gamma$ to the y-axis. This can be proved by deriving the equation of the ellipsoid when equation (6) is used to modify the B coefficients in (4). The ellipticity, and hence the amount of birefringence increases with the magnitude of the electric field. A field aligned with the y-axis causes birefringence between the horizontally and vertically polarised beams, and one aligned with the x-axis causes birefringence between the polarisation states at $\pm\pi/4$ to the y-axis. Rotating the direction of the external electric field rotates the birefringent axes in the crystal. On the Poincaré sphere the rotation axis for the birefringent element lies in the equatorial plane at an angle $2\gamma$ to the HV axis. Varying both the strength of the electric field and its orientation in the crystal provides a birefringent element that satisfies the requirements for the polarisation controllers described in previous sections.

The technique of applying a rotating electric field to a lithium niobate crystal has been proposed previously for analysis of polarisation noise and frequency shifting. Both these systems used a rotating field of *constant* magnitude in a bulk optic crystal, producing an electro-optic equivalent of a rotating fractional wave plate. However such an arrangement has not been used previously for polarisation control.

Figure 27:
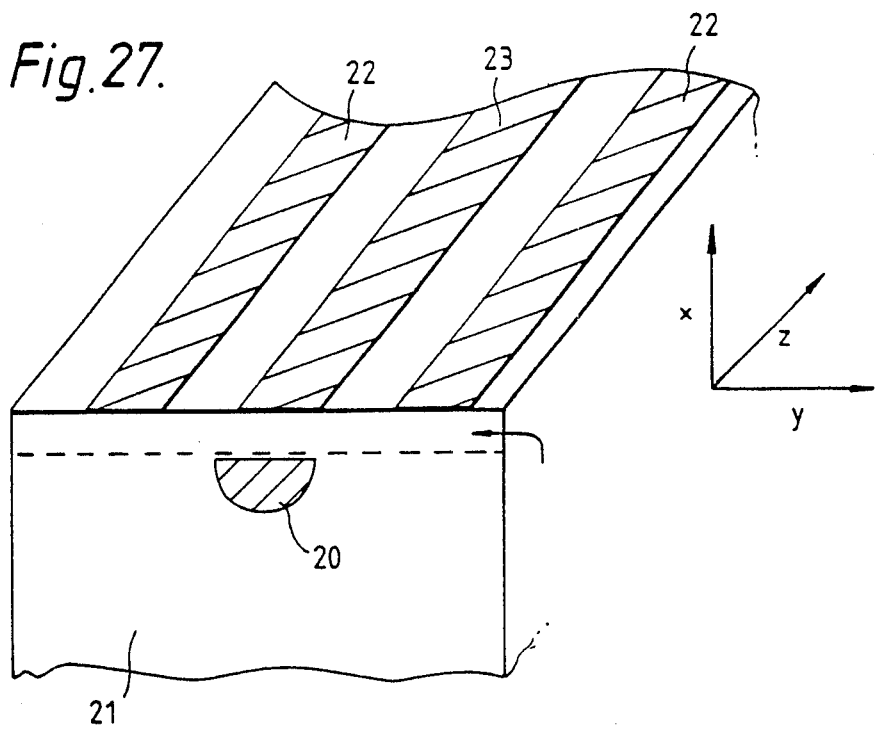
FIG. 27 is a diagrammatic represnetation of an embodiment of the present invention in which three longitudinal electrodes are arranged symmetrically over a z-propagating waveguide diffused into an x-cut lithium niobate substrate.
Figure 28A:
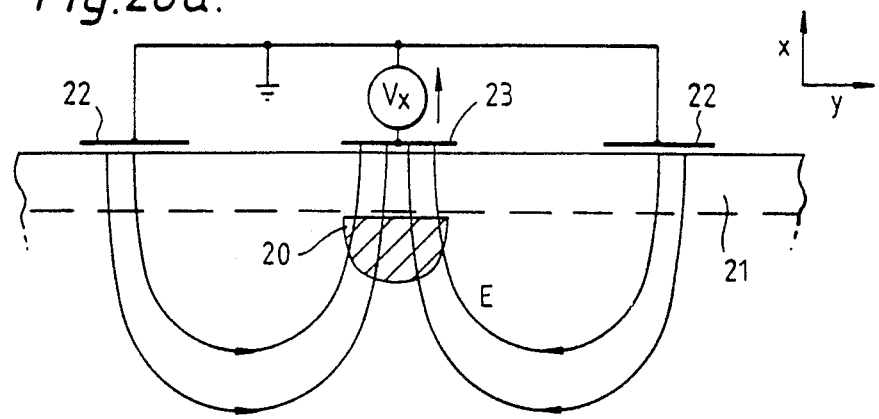
FIGs. 28a, 28b and 28c are diagrammatically cross-sections across a waveguide embodying the invention, and show various electric fields produced by electrodes associated with the waveguide.
Figure 28B:
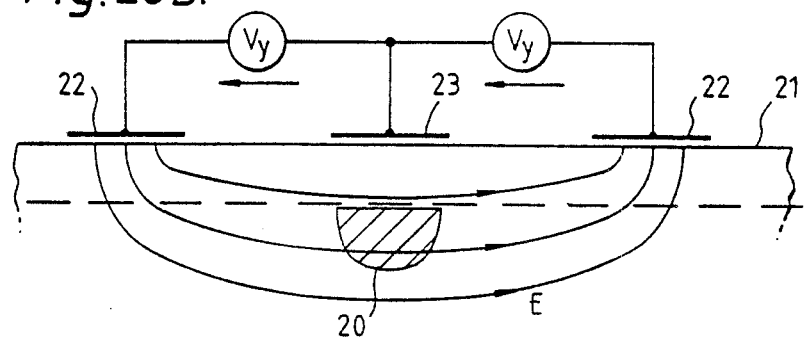

For compatibility with coherent communication systems a polarisation control device must preferably be made in integrated form. FIG. 27 shows how this might be achieved. Three longitudinal electrodes 22, 23, 22 are arranged symmetrically over a z-propagating waveguide 20 diffused into an x-cut lithium niobate substrate 21. FIG. 28a shows how a voltage applied to the centre electrode when the outside two electrodes are grounded produces an x-directed electric field over the guiding region. FIG. 28b shows how a voltage applied to the centre electrode when the outside two electrodes are grounded produces an x-directed electric field over the guiding region. FIG. 28b shows how a differential voltage between the outside two electrodes produces a y-directed field. Voltages applied to all electrodes simultaneously can, in principle, produce a field at any angle to the waveguide.

A similar structure has been proposed previously in other fields, for use as an electrically tunable TE-TM mode convertor, the x-field providing the mode conversion and the y-field providing the tuning, and has been constructed for use at 630 nm wavelength. A five element controller incorporating such a device for mode conversion has also been proposed previously. However, none of these previously known proposals shows the possibility of using such a device as a general polarisation transformer, as may be provided in embodiments of the present invention.

Practical devices will depart from the ideal behaviour described above. In particular two effects may cause problems: modal birefringence and poor coupling of the applied electric field over the waveguide region. Modal birefringence arises because the waveguide structure is asymmetrical. The guiding mechanism is provided in part by the refractive index difference between the Lithium Niobate material and the buffer layer, but this also causes the horizontally polarised (TE) and vertically polarised (TM) modes to have different propagation constants. The modal birefringence would appear as a residual ellipticity in the polarisation x-y ellipse shown in FIG. 26b, even in the absence of an externally applied electric field. The modal birefringence can be cancelled by applying an offset voltage to the electrodes providing the horizontal field, providing that this is below the breakdown voltage of the device. Alternatively, modal birefringence might be cancelled by offsetting the waveguide slightly from the crystallographic z axis.

Figure 29A:
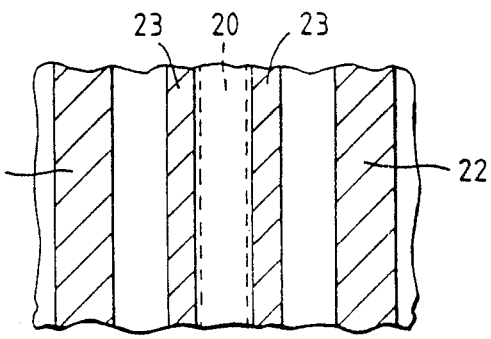
FIGS. 29a and 29b are respectively plan and cross-sectional views of an alternative electrode structure for a waveguide embodying the present invention.
Figure 29B:
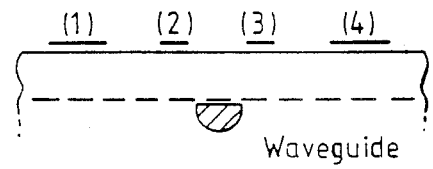
Figure 28C:
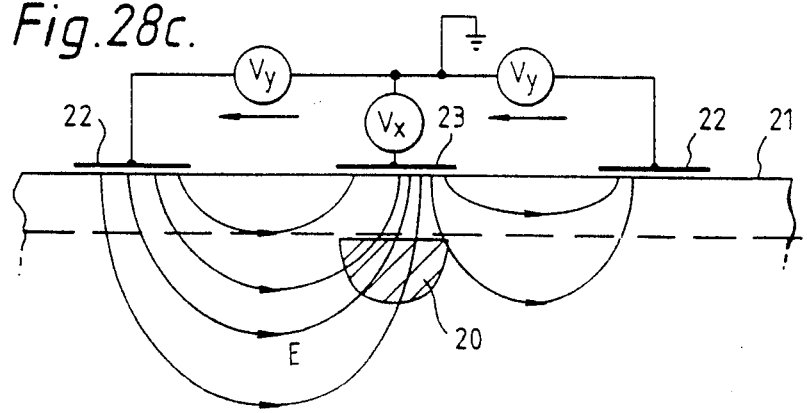

Poor coupling of the electric field to the optical field will occur if the electric field is not uniform over the region of the waveguide, or is concentrated elsewhere in the bulk material. The electrode structure shown in FIGS. 27 and 28 is unlikely to produce a uniform field, thus increasing the voltage required to drive the device. FIG. 29 shows a structure using four parallel electrodes that may improve coupling of the horizontal field. Here the horizontal field is applied by the centre two electrodes and the vertical field is applied by the voltage between the mean of these two and the outside two electrodes. This structure would require high driving voltages to provide the required vertical field, but would improve the coupling of the horizontal field and therefore reduce the offset voltage required to cancel the modal birefringence.

Figure 30:
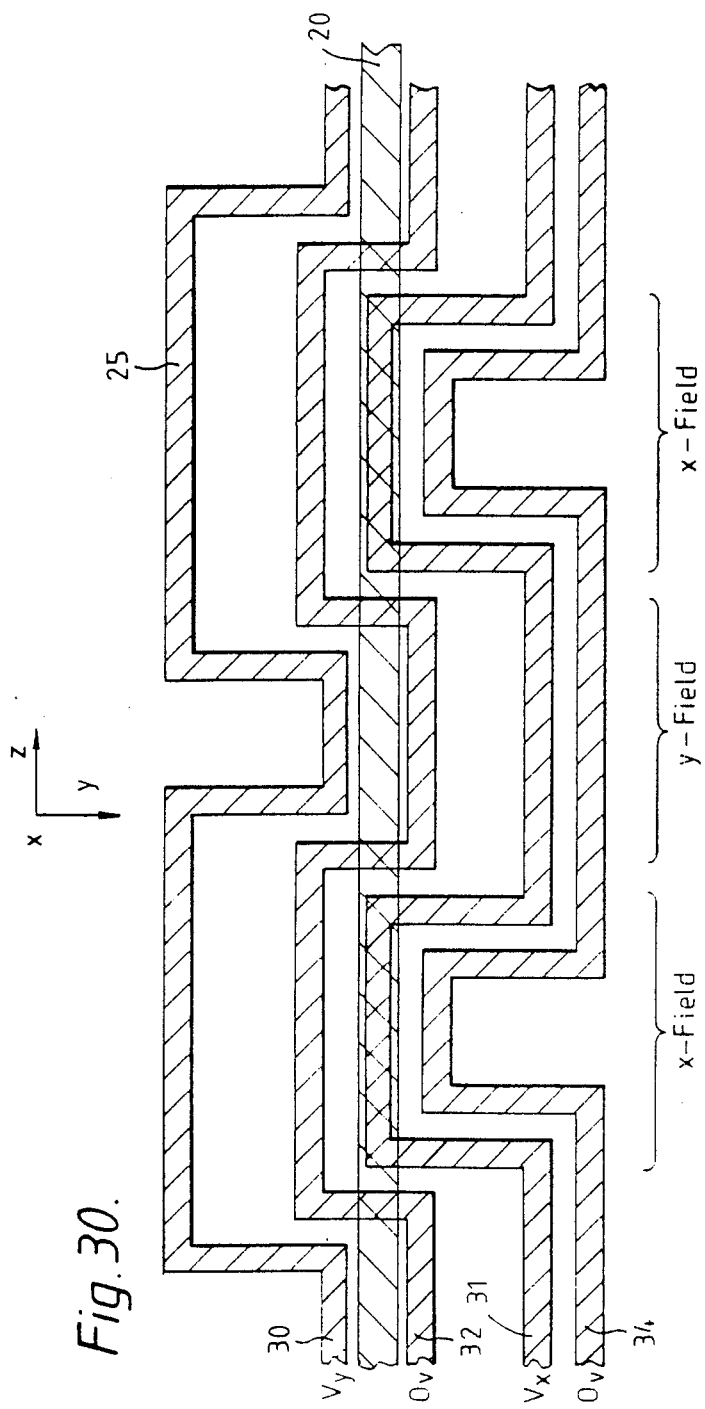
FIG. 30 is of diagrammatic representation in plan view of a further alternative electrode structure for use with a waveguide embodying the present invention.
Figure 30A:
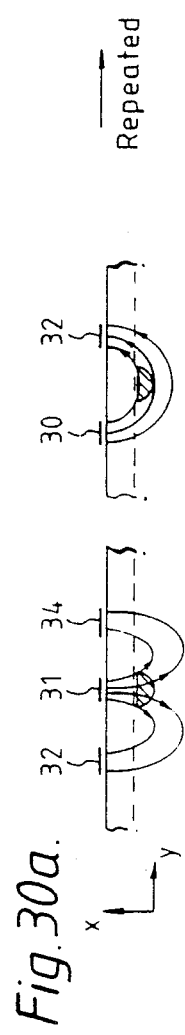
FIG. 30a shows in cross-section various electric fields which may be produced by the electrode configuration in FIG. 30.

An alternative electrode pattern is shown in plan view in FIG. 30. In this example the x-field and y-field are applied alternately to the waveguide using a snaking electrode structure. Two electrodes (32 and 34) are at ground potential and the other 30 two and 31 carry the control voltages as shown in FIG. 30a. This pattern would be repeated many times in a single element, thereby ensuring that each repetition of the pattern only contributed a small amount to the total birefringence. When viewed on the Poincare sphere, each repeat of the pattern gives first a rotation about axis HV (horizontal electric field) through a small angle, $\delta\theta_x$ say, followed by a rotation about axis PQ (vertical electric field) through a small angle $\delta\theta_y$. It is well known that, as $\delta\theta_x$ and $\delta\theta_y$ become infinitessimal, the two rotations add vectorially to give a net rotation through an infinitessimal angle $$\delta\theta_T = \sqrt{(\delta\theta_x^2 + \delta\theta_y^2)},$$

about an axis in the equatorial plane lying at an angle arctan $(\delta\theta_y/\delta\theta_x)$ to HV. This is shown schematically in FIG. 30d. In practice the two rotation angles will not be infinitessimal, but will be small. It can be shown that the net rotation of a single repeat of the pattern is then about an axis whose z component on intersection with the Poincaré sphere is given by $$z^2 = \frac{1}{\cot^2(\delta\theta_x) + \cot^2(\delta\theta_y) + 1}$$

Figure 30B:
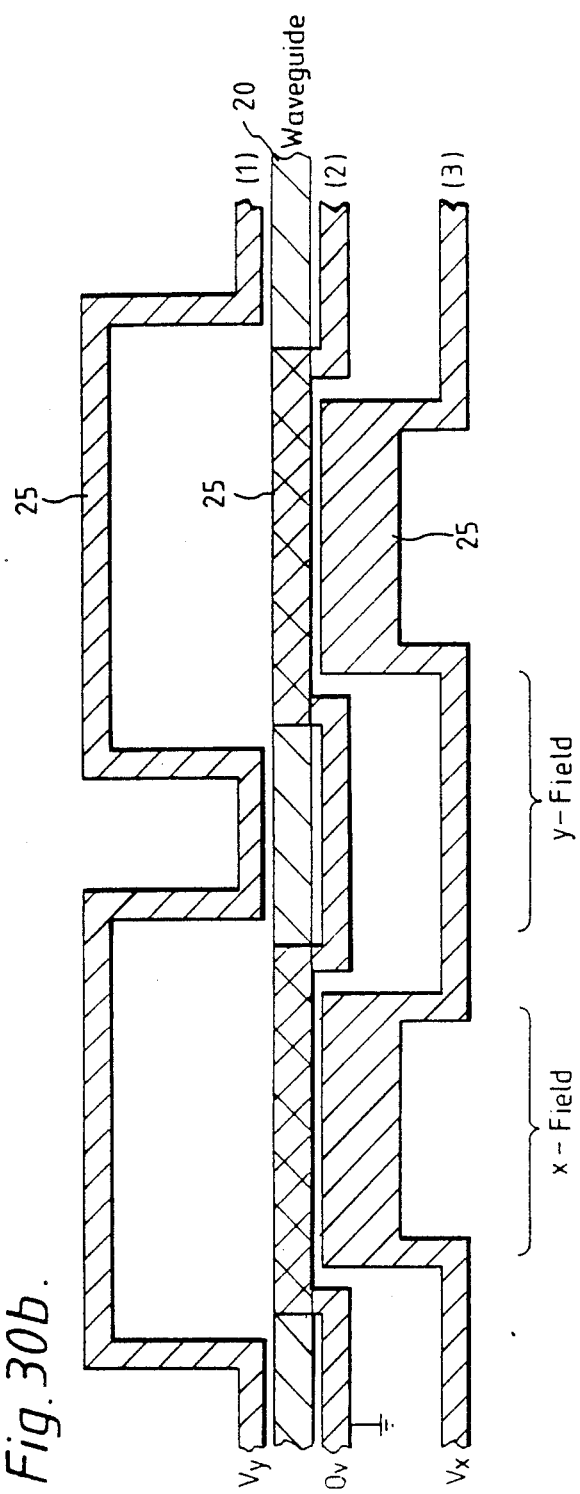
FIG. 30b shows an alternative electrode configuration to the configuration shown in FIG. 30, FIg. 30c again shows in cross-section various electric fields which may be produced by the electrode configuration.
Figure 30C:
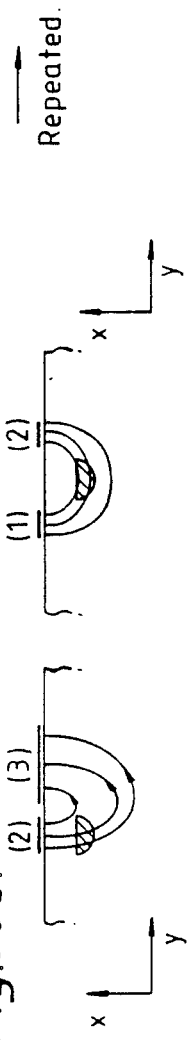
FIG. 30d is an explanatory diagram showing the nature of transformations produced by the electrode configurations of FIGS. 30b and 30c.

If $\delta\theta_x$ and $\delta\theta_y$ are small then $z^2$ is small, and the axis lies effectively on the equator at the stated angle arctan $(\delta\theta_x/\delta\theta_y)$ to HV. In a complete control element, each repeat of the electrode pattern contributes a small rotation about this axis, to give a net large and variable rotation. The complete element would then behave as if the horizontal and vertical fields were distributed uniformly along the length of the waveguide. Further alternative electrode structures 25 are shown in FIGS. 30b and 30c. The technique of applying small birefringences about rapidly alternating fixed axes to produce net rotation about variable axes is also applicable to other implementations of this control element. For example, an optical fibre could be squeezed alternately at 0 and $\pi/4$ to a chosen axis, giving alternate linear birefringences about orthogonal axes on the Poincaré sphere.

There will now be discussed the voltage requirements for polarisation control devices embodying the invention. The total birefringence available from an element is proportional to its length and the electric field applied to the guide. An upper limit on the field is imposed by breakdown of the lithium niobate itself and also other materials used in the contruction of the device. Other operating considerations may also limit the maximum available drive voltage. The length of the device is limited principally by the maximum substrate size.

Figures 30D, 31A, 31B, 31C, 31D:
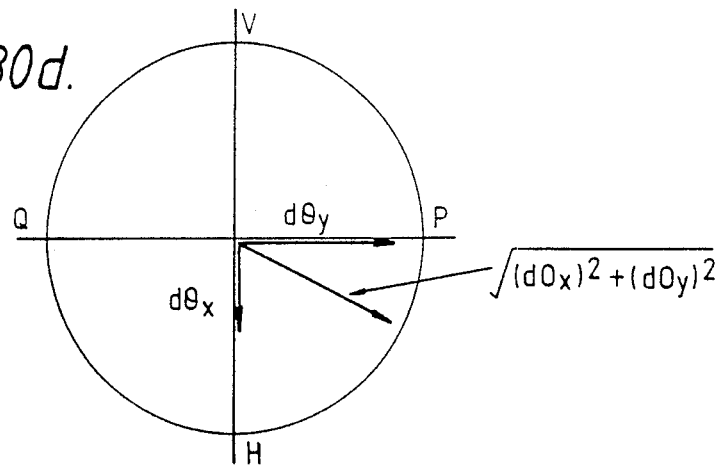

The simplest control scheme described earlier uses a single birefringent element, which may therefore occupy the entire length of the substrate, as shown in FIG. 31a. This element will require a certain voltage, V say, to induce a total birefringence of $2\pi$. For a device approximately 40 mm long with electrode spacing of 5 $\mu$m the drive voltage V can be estimated as about 20 volts, although this figure will be increased if the overlap of the optical and electrical fields is poor.

If two elements are required then each of these can only be half the length of the substrate, as shown in FIGS. 31b and 31c. For the control in which two elements, both providing $2\pi$ birefringence, are used the drive voltage would be 2 V (FIG. 31b), whereas this can be reduced to V for the control strategy that requires only $\pi$ birefringence from each element (FIG. 31c).

Figure 32:
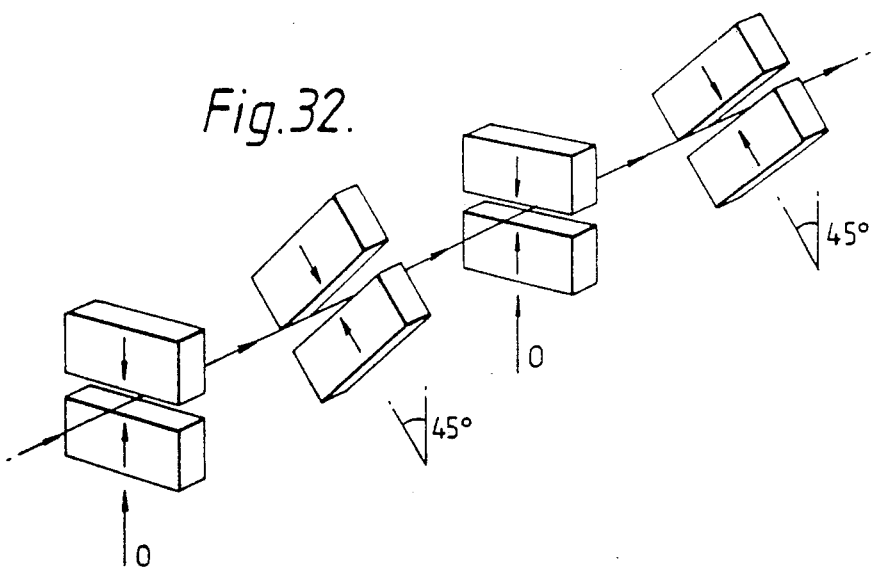
FIG. 32 is a diagrammatic representation of a known arrangement of four squeezers acting on an optic fibre to produce a desired polarisation transformation on a Poincaré sphere.
Figure 33A:
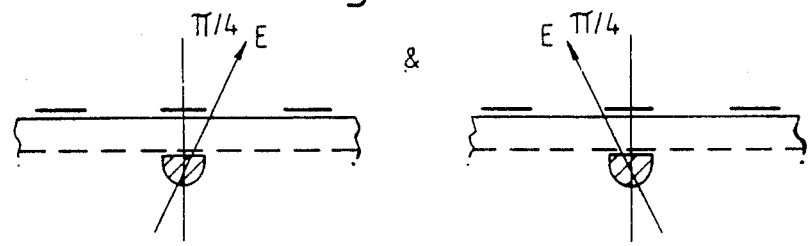
FIG. 33 shows an arrangement by which the effect of the four squeezers in FIG. 32 can be achieved in a solid state waveguide embodying the present invention.
Figure 33B:
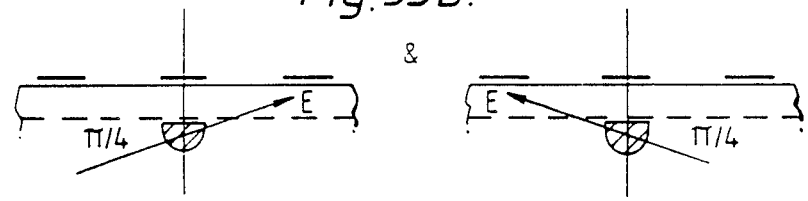

There will now be discussed other applications for birefringent devices embodying the invention. The versatility of these elements lends them to use in control schemes other than those described here. In principle they can replace any rotating fractional wave plate or any fixed axis variable birefringent device. They do not provide circular birefringence, although elements can be cascaded so that their overall behaviour is the same as circular birefringence. One attractive application is to replace the squeezer arrangement shown in FIG. 32. This arrangement has previously been shown to provide endless control for one fixed polarisation state and one arbitrarily varying state. It can also be used to provide endless control between two arbitrarily varying states. The four squeezers are arranged in an alternating sequence to provide squeezing at 0 and $\pi/4$ to the horizontal, and the Lithium Niobate device could be configured in an equivalent way. In practice it may be desirable to arrange the birefringent axes symmetrically either side of the vertical or either side of the horizontal, as shown in FIG. 33. The completed device would have the electrode structure shown in FIG. 31d. To provide $2\pi$ birefringence in each element of this device requires a drive voltage of 4 V.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. Apparatus for processing one or more optical signals to produce a desired polarisation transformation comprising at least one variable birefringent device adapted to provide a series of small rotations on a Poincaré sphere about a first axis of rotation, and a series of small rotations about a second axis, and to alternate rapidly between the rotations of the two series so as to give an effect equivalent to a rotation about a third, effective, axis, and control means adapted to vary the cumulative amounts of the small rotations so as to vary the total rotation on the Poincaré sphere, and to vary the relative amounts of the small rotations of the said two series so as to vary the direction of the said effective axis.

2. Apparatus for processing one or more optical signals to produce a desired polarisation transformation comprising at least one variable birefringent device adapted to provide a rotation of variable amount of the Poincaré sphere about an axis, or effective axis, of rotation which itself may be varied in direction, in a plane which passes through the origin of the Poincaré sphere and control means adapted to vary the amount of rotation on the Poincaré sphere produced by the birefringent device, and to vary the direction of the axis, or effective axis, about which the rotation takes place, so as to achieve the desired polarisation transformation, in which the control means is adapted to detect any increase of the magnitude of birefringence introduced by the device beyond $2\pi$ or a chosen multiple of $2\pi$, and upon such detection to rotate the axis, or effective axis, of rotation of the device on the Poincaré sphere through an angle of magnitude of $\pi$ or an odd multiple of $\pi$.

3. Apparatus for processing one or more optical signals to produce a desired polarisation transformation comprising:

at least one variable birefringent device adapted to provide a rotation of variable amount on the Poincaré sphere about an axis, or effective axis, of rotation which itself may be varied in direction in a plane which passes through the origin of the Poincaré sphere and control means adapted to vary the amount of rotation on the Poincaré sphere produced by the birefringent device, and to vary the direction of the axis or effective axis about which the rotation takes place, so as to achieve the desired polarisation transformation;

and wherein said control means is arranged to vary the direction of the axis of rotation on the Poincaré sphere in such a manner as to prevent substantially the magnitude of the birefringence introduced by the device exceeding $2\pi$ or a chosen multiple of $2\pi$.

4. Apparatus according to claim 3 in which the said variable birefringent device is capable of producing rotation on the Poincaré sphere up to a finite limit, but is capable of endless rotation of the axis, or effective axis, of rotation by which the device effects change of polarisation state on the Poincaré sphere.

5. Apparatus according to claim 3 in which the control means is adapted to produce a polarisation transformation from a fixed and known state of polarisation of circularly polarised light to a state of polarisation which varies with time, the birefringent device being capable of endless rotation of the direction of its axis of rotation on the Poincaré sphere.

6. Apparatus according to claim 3 in which the control means is adapted to produce a polarisation transformation from a first state of polarisation which varies with time to a second state of polarisation which varies with time, the birefringent device being capable of endless rotation of the direction of its axis of rotation on the Poincaré sphere.

7. Apparatus according to claim 3 in which there are provided first and second variable birefringent devices, each adapted to provide a rotation of variable amount on the Poincaré sphere about an axis, or effective axis, of rotation which itself may be varied in direction in a plane which passes through the origin of the Poincaré sphere, means for assessing the desired polarisation transformation, and control means adapted to vary the birefringent devices in response to an output from the said assessing means, in which the control means is adapted to effect the required transformation in normal operation by varying one of said devices, and is adapted to detect when the said one device reaches a limit of birefringence, and thereafter to effect the required transformation by varying the other previously non-operative one of said devices, while at the same time progressively reducing the birefringence introduced by varying said one of said devices.

8. Apparatus according to claim 7 in which each device is capable of producing a rotation on a Poincaré sphere of a magnitude of slightly more than $\pi$ or a chosen multiple of $\pi$, and the control means is set to interchange the functions of the two elements if either element reaches a state where it introduces a rotation of magnitude of $\pi$ or a chosen multiple of $\pi$ on the Poincaré sphere.

9. Apparatus according to claim 7 in which each device is capable of producing a rotation on a Poincaré sphere of a magnitude of slightly more than $2\pi$ or a chosen multiple of $2\pi$, and the control means is set to interchange the functions of the two elements if either element reaches a state where it introduces a rotation of magnitude of $2\pi$ or a chosen multiple of $2\pi$ on the Poincaré sphere.

10. Apparatus according to claim 3 when arranged for adjusting the state of polarisation of one or both of two optical signals to achieve a chosen relationship between the states of the signals, the apparatus including means for assessing the relationship between the polarisation states of the two signals after the said polarisation transformation, and the control means being adapted to vary the birefringent device in response to an output from the said assessing means.

11. Apparatus according to claim 10 including a second variable birefringent device adapted to provide a rotation of variable amount on a Poincaré sphere about an axis of rotation which itself may be varied in direction in a plane which passes through the origin of the Poincaré sphere, in which the control means is adapted to effect the required transformation in normal operation by varying one of said devices to track changes in the states of polarisation of one or both of the optical signals.

12. Apparatus according to claim 11 in which the control means is adapted to control the other non-varied one of said devices so as to reduce any birefringence being produced by the said non-varied device.

13. Apparatus according to claim 11 or 12 in which the control means is adapted to detect when said varied one of said devices reaches a limit of birefringence, and thereafter to effect the required transformation by varying the other previously non-varied one of said devices, which then becomes the varied device to track said changes, while at the same time progressively reducing the birefringence introduced by the said one of said devices, which has now become the non-varied device, away from the said limit.

14. Apparatus according to claim 7, 11, 12 or 13 in which the control means is adapted to reduce the birefringence introduced by a non-varied device until either that birefringence reaches zero or until the other, varied, element reaches a limit of birefringence, whereupon in either eventuality the control means interchanges the functions of the two elements.

15. Apparatus according to claim 11 or 12 in which the control means repeatedly exchanges the varied and non-varied devices so as to maintain the birefringence of both devices below a chosen limit.

16. Apparatus according to claim 3 in which the birefringent device is adapted to provide a series of small rotations on a Poincaré sphere about a first axis of rotation, and a series of small rotations about a second axis orthogonal to the first axis, and to alternate rapidly between rotations of the two series so as to give an effect equivalent to a rotation about a third, effective, axis, the control means being adapted to vary the relative amounts of the said small rotations of the said two series in such a manner as to vary the direction of the said effective axis.

17. Apparatus according to claim 3 in which the or each variable birefringent device comprises a waveguide formed of electro-optic material, and input means for producing in the electro-optic material an electric field of variable strength and variable orientation, the control means being adapted to vary the amount of rotation on the Poincaré sphere by varying the strength of the electric field in the electro-optic material, and to vary the direction of the axis of rotation on the Poincaré sphere by varying the orientation of the electric field in the electro-optic material.

18. Apparatus according to claim 17 in which the input means are arranged to apply to the electro-optic material two orthogonal electric fields both at right angles to the direction of propagation of light through the material, the control means being arranged to vary the strengths of the two orthogonal electric fields in such a manner as to vary the strength and orientation of the net electric field in the material.

19. Apparatus according to claim 17 or 18 in which the electro-optic material has substantially the same refractive index in all directions perpendicular to the direction of propagation of light.

20. Apparatus according to any of claims 17 to 18 in which the said electro-optic material includes a residual birefringence independent of any applied electric fields, and the input means are arranged to apply a corrective voltage to counteract the residual birefringence, in addition to the application of the varying electric fields to achieve the required transformation on the Poincaré sphere.

21. Apparatus according to any of claims 17 or 18 in which the electro-optic material is lithium niobate.

22. Apparatus according to claim 21 in which the or each birefringent device comprises a z-propagating waveguide diffused into a lithium niobate substrate.

23. Apparatus according to any of claims 17 or 18 in which the input means comprises at least three elongate electrodes arranged symmetrically over the waveguide, two outer electrodes being positioned one on either side of the waveguide and being arranged to provide a first electric field in the waveguide by a potential difference between the outer electrodes, and one or more central electrodes being arranged to provide a second electric field substantially at right angles to the first electric field in the electro-optic material, by means of a potential difference between the central electrode or electrodes, and the two outer electrodes.

24. Apparatus according to any of claims 17 or 18 in which the input means comprises a plurality of parallel electrodes extending generally along the length of the wave guide, but arranged to cross to and fro across the waveguide repeatedly, the arrangement being such that in effect two orthogonal electric fields are distributed uniformly along the length of the waveguide, and can be varied by the control means.

25. Apparatus for processing one or more optical signals to produce a desired polarisation transformation comprising:
   at least one variable birefringent device adapted to provide a rotation of variable amount on the Poincaré sphere about an axis, or effective axis, of rotation which itself may be varied in direction in a plane which passes through the origin of the Poincaré sphere and
   control means adapted to vary the amount of rotation on the Poincaré sphere produced by the birefringent device, and to vary the direction of the axis or effective axis about which the rotation takes place, so as to achieve the desired polarisation transformation;
   and wherein said control means is adapted to detect any increase of the magnitude of birefringence introduced by the device beyond $2\pi$ or a chosen multiple of $2\pi$, and upon such detection to rotate the axis of rotation of the device on the Poincaré sphere through an angle of magnitude of $\pi$ or an odd multiple of $\pi$.

26. Apparatus according to claim 25 in which the control means is adapted to detect when a transformation has been introduced such that a rotation of the said axis of rotation has no effect on the relationship between the initial and final states of polarisation between which the transformation has taken place.

27. Apparatus according to claim 25 in which the variable birefringent device is calibrated to allow the control means to detect when a birefringence of magnitude of $2\pi$ or a chosen multiple of $2\pi$ has been introduced by the device.

28. The method of processing one or more optical signals to produce a desired polarisation transformation comprising:
   causing at least one variable birefringent device to provide a rotation of variable amount on the Poincaré sphere about an axis or effective axis, of rotation which itself may be varied in direction in a plane which passes through the origin of the Poincaré sphere and
   controlling said device so as to vary the amount of rotation on the Poincaré sphere produced by the birefringent device, and to vary the direction of the axis or effective axis about which the rotation takes place, so as to achieve the desired polarisation transformation; and
   further controlling the device to vary the direction of the axis of rotation on the Poincaré sphere in such a manner as to prevent substantially the magnitude of the birefringence introduced by the device exceeding $2\pi$ or a chosen multiple of $2\pi$.

29. The method according to claim 28 in which the said variable birefringent device is capable of producing rotation on the Poincaré sphere up to a finite limit, but is capable of endless rotation of the axis, or effective axis, of rotation by which the device effects change of polarisation state on the Poincaré sphere.

30. The method according to claim 28 further including:
   producing a polarisation transformation from a fixed and known state of polarisation of circularly polarised light to a state of polarisation which varies with time, the birefringent device being capable of endless rotation of the direction of its axis of rotation on the Poincaré sphere.

31. The method according to claim 28 further including:
   producing a polarisation transformation from a first state of polarisation which varies with time to a second state of polarisation which varies with time, the birefringent device being capable of endless rotation of the direction of its axis of rotation on the Poincaré sphere.

32. The method according to claim 28 including:
   providing first and second variable birefringent devices, each adapted to provide a rotation of variable amount on the Poincaré sphere about an axis, or effective axis, or rotation which itself may be varied in direction in a plane which passes through the origin of the Poincaré sphere;
   assessing the desired polarisation transformation, and varying the birefringent devices in response to an output from the said assessing step,
   so as to effect the required transformation in normal operation by varying one of said devices, detecting when the said one device reaches a limit of birefringence, and thereafter effecting the required transformation by varying the other previously non-operative one of said devices, while at the same time progressively reducing the birefringence by varying said one of said devices.

33. The method of processing one or more optical signals to produce a desired polarisation transformation comprising:
   causing at least one variable birefringent device to provide a rotation of variable amount on the Poincaré sphere about an axis, or effective axis, of rotation which itself may be varied in direction in a plane which passes through the origin of the Poincaré sphere and controlling said device so as to vary the amount of rotation on the Poincaré sphere produced by the birefringent device, and to vary the direction of the axis or effective axis about which the rotation takes place, so as to achieve the desired polarisation transformation; and detecting any increase of the magnitude of birefringence introduced by the device beyond $2\pi$ or a chosen multiple of $2\pi$, and upon such detection rotating the axis of rotation of the device on the Poincaré sphere through an angle of magnitude of $\pi$ or an odd multiple of $\pi$.

34. The method according to claim 33 including:
detecting when a transformation has been introduced such that a rotation of the said axis of rotation has no effect on the relationship between the initial and final states of polarisation between which the transformation has taken place.

35. The method according to claim 33 including:
calibrating the birefringent device to allow detecting when a birefringence of magnitude of $2\pi$ or a chosen multiple of $2\pi$ has been introduced by the device.

* * * * *